United States Patent
Shiota

(10) Patent No.: US 7,199,840 B2
(45) Date of Patent: Apr. 3, 2007

(54) DYNAMIC GRAY SCALE RANGE ADJUSTMENT APPARATUS AND METHOD

(75) Inventor: Tetsuro Shiota, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 688 days.

(21) Appl. No.: 10/343,060

(22) PCT Filed: Mar. 28, 2002

(86) PCT No.: PCT/JP02/03033

§ 371 (c)(1),
(2), (4) Date: Jan. 28, 2003

(87) PCT Pub. No.: WO02/100093

PCT Pub. Date: Dec. 12, 2002

(65) Prior Publication Data

US 2004/0001165 A1  Jan. 1, 2004

(30) Foreign Application Priority Data

May 31, 2001 (JP) ............................. 2001-165053
Jun. 8, 2001 (JP) ............................. 2001-174666

(51) Int. Cl.
H04N 5/14 (2006.01)
H04N 5/52 (2006.01)

(52) U.S. Cl. ...................................... 348/678; 348/672

(58) Field of Classification Search ................ 348/671, 348/672, 674, 678, 254, 255; 382/168, 169, 382/172; 358/3.01; 345/89, 589
See application file for complete search history.

(56) References Cited

U.S. PATENT DOCUMENTS 5,742,704 A * 4/1998 Suzuki et al. ............... 382/176
5,751,846 A 5/1998 Higgins-Luthman et al.
6,111,607 A 8/2000 Kameyama (Continued)

FOREIGN PATENT DOCUMENTS

EP  0 723 364  7/1996

(Continued)

*Primary Examiner*—Victor R. Kostak
(74) *Attorney, Agent, or Firm*—Wenderoth, Lind & Ponack, L.L.P.

(57) ABSTRACT

In gray-scale correction where extension to a dynamic range is performed based on a maximum value and a minimum value of a video luminance signal, sufficient correction effects cannot be obtained in some displayed images. Therefore, a histogram detecting circuit (2), a maximum value detecting circuit (3), and a minimum value detecting circuit (4) respectively detects, for each field, a maximum value (Kmax) and a minimum value (Kmin) in a detection WINDOW set in a screen, and distribution information in a gray-scale direction. The detected maximum value (Kmax) and minimum value (Kmin) are respectively corrected by a maximum value correcting circuit (5) and a minimum value correcting circuit (6) based on the output results of the histogram detecting circuit (2), and output as a corrected maximum value (Lmax) and a corrected minimum value (Lmin). Based on these corrected maximum value (Lmax) and a corrected minimum value (Lmin), an input video luminance signal is corrected. Thus, it is possible to obtain optimal effects of gray-scale correction in accordance with a scene.

16 Claims, 20 Drawing Sheets

U.S. PATENT DOCUMENTS

| | | |
|---|---|---|
| 6,111,980 A | 8/2000 | Sano et al. |
| 6,236,751 B1 | 5/2001 | Farrell |
| 6,825,884 B1 * | 11/2004 | Horiuchi .................. 348/362 |
| 2001/0033260 A1 * | 10/2001 | Nishitani et al. ............ 345/87 |
| 2004/0175054 A1 * | 9/2004 | Ogata et al. ................ 382/274 |
| 2004/0201562 A1 * | 10/2004 | Funamoto et al. ............ 345/89 |

FOREIGN PATENT DOCUMENTS

| | | |
|---|---|---|
| EP | 0 866 608 | 3/1998 |
| JP | 63-117589 | 5/1988 |
| JP | 2-309871 | 12/1990 |
| JP | 7-23287 | 1/1995 |
| JP | 10-248024 | 9/1998 |
| JP | 2000-324363 | 11/2000 |
| JP | 2001-27890 | 1/2001 |
| JP | 2001-134226 | 5/2001 |

* cited by examiner

FIG. 3
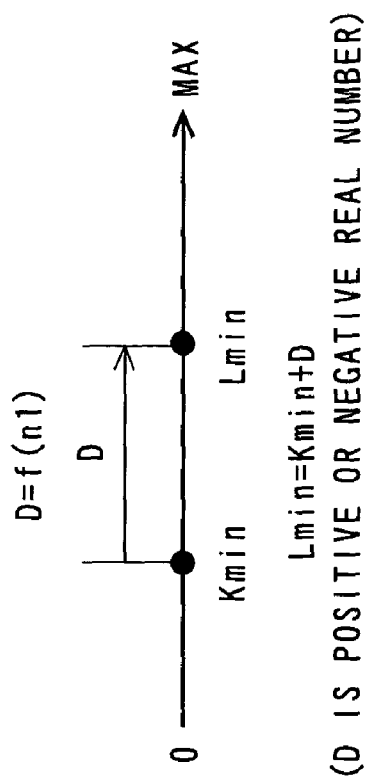
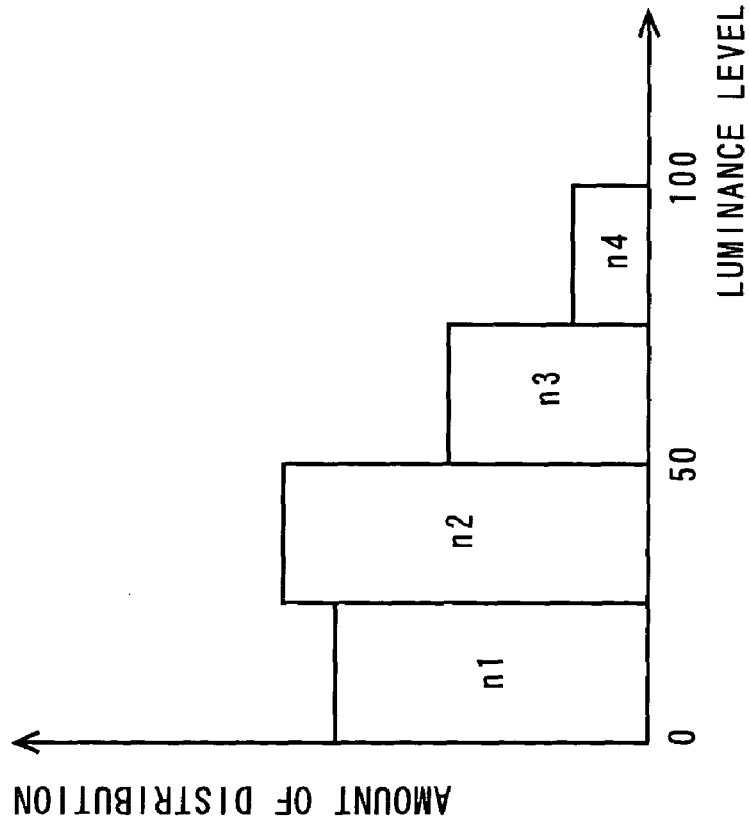

F I G. 19

| APL VARIED VALUE | SELECT SIGNAL |
|---|---|
| EQUAL TO OR LARGER THAN U% OF SIGNAL D RANGE | INPUT THROUGH SECTION 26 |
| EQUAL TO OR SMALLER THAN U% AND EQUAL TO OR LARGER THAN V% OF SIGNAL D RANGE | FILTER PROCESSING SECTION 27 |
| EQUAL TO OR SMALLER THAN V% OF SIGNAL D RANGE | INPUT INTERRUPTING SECTION 28 |

(U, V; ARBITRARY POSITIVE INTEGERS WHERE U > V)

DYNAMIC GRAY SCALE RANGE ADJUSTMENT APPARATUS AND METHOD

TECHNICAL FIELD

The present invention relates to image processing apparatuses and image processing methods and, more specifically, to an image processing apparatus and an image processing method that corrects a gray scale of a displayed image by correcting a video luminance signal.

BACKGROUND ART

Conventionally, the image processing apparatus of the above type uses almost the entire effective display period on a display screen as a sampling window for calculating correction data from maximum and minimum values of a luminance signal, and corrects the input video luminance signal for each field or frame, thereby achieving high quality of images.

For example, there is a scheme known as black extension/white extension. In this scheme, minimum and maximum values of the video luminance signal within the effective display period are detected for each field or each frame; the detected maximum and minimum values of the input luminance signal are converted into a maximum value (255 in digital 8-bit processing) and a minimum value (0, in general), respectively, of a dynamic range of a video signal processing system; and all signals between the minimum and maximum values of the input luminance signal are also linearly interpolated. With this, correction can be made so that the dynamic range held by the signal processing system is fully used for any input luminance signal. An example of this is disclosed in Japanese Patent Laid-Open Publication No. 10-248024.

In the above conventional scheme, however, a correction table is calculated based on the maximum and minimum values of the video luminance signal actually detected, and therefore correction may sometimes not be sufficient. For example, in a movie scene most of which is dark for an effective display period, when even one pixel in the scene has a maximum value (255 in 8-bit processing) of a dynamic range of the processing system, correction by extension in a white direction is not performed. This causes a problem that sufficient gray scale representations cannot be made for some displayed images.

For this reason, an object of the present invention is to provide an image processing apparatus and an image processing method capable of performing sufficient gray scale representations irrespective of a displayed image, and especially capable of doing so in accordance with properties of the displayed image even if a width of luminance distribution of a video luminance signal is large.

The above conventional scheme is not meant to be restrictive. In general, when gray-scale correction is performed by correcting an input video luminance signal, color-difference signals (U, V) are also corrected at the same time in order to compensate for changes in how video looks due to the correction of the luminance signal. At this time, in a case where the degree of correction of the luminance signal is too large, if the color-difference signals are corrected based on that degree of correction, the color-difference signals become saturated. That is, after correction, values of the color-difference signals before correction equal to or larger than a predetermined value become maximum among values that can be originally taken by the color-difference signal after correction. Therefore, information about a color difference as to these values is lost. Moreover, when these luminance signal and color-difference signals are converted into RGB signals for image display on a PC display, for example, the RGB signals can become saturated even though these luminance signal or color-difference signals have not been saturated. Also in this case, as with the case of the color-difference signals, information about color difference as to a portion representing saturation of the RGB signals after correction is lost. As a result of the above, the quality of the displayed image is degraded.

Therefore, another object of the present invention is to provide an image processing apparatus and an image processing method in which color-difference signals or RGB signals are not saturated irrespective of the degree of correction of a luminance signal at the time of gray-scale correction.

Furthermore, in the above conventional scheme, when maximum and minimum values for each field are detected, information in a detection WINDOW is evenly sampled. When such scheme is used for detecting the maximum value, if data unrelated to an original image, such as white subtitles in a film, is inserted afterwards into video signals, the data inserted afterwards is detected as the maximum value. With this, a value having a level much higher than that of the original image is determined as the maximum value and, based on this maximum value, the above-described gray-scale correction is performed. Consequently, the amount of extension in a process, such as white extension in which a gray scale is extended in a white direction for correction, is suppressed, and therefore sufficient correction effects cannot be achieved.

Still further, a portion outside a display area in horizontal and vertical directions have a luminance signal of generally approximately 0. If the luminance level of this portion is detected as the minimum value of the image, a level under a level of black of the original image is erroneously determined as black. Consequently, extension of the gray scale in a black direction is suppressed, and therefore sufficient correction effects cannot be achieved.

Therefore, still another object of the present invention is to provide an image processing apparatus and an image processing method capable of detecting a maximum value of an original image so that, when gray-scale correction is performed in which a maximum value of a video luminance signal is converted into a maximum value of a dynamic range of a video signal processing system, for example, sufficient gray-scale correction effects can be achieved even if a signal unrelated to the original image exists in video signals.

Meanwhile, in a case where gray-scale correction is performed on motion pictures, when a characteristic detection signal indicative of characteristics of an image, such as maximum and minimum values within a display area, is detected, it is required to perform contradictory operations: an operation for causing the characteristic detection signal to follow an abrupt scene change and an operation for preventing a fluctuation of the characteristic detection signal due to a subtle scene change. Conventionally, however, it is difficult to satisfy this requirement with high accuracy.

Therefore, still another object of the present invention is to provide an image processing apparatus and an image processing method capable of correcting a maximum value for use in gray-scale correction to an optimal value in accordance with a scene change so as to follow an abrupt scheme change and not to follow a subtle scheme change, when motion pictures are subjected to gray-scale correction, for example, in which a maximum value of a video luminance signal is converted into a maximum value of a dynamic range in a video signal processing system.

SUMMARY OF THE INVENTION

To achieve the above objects, the present invention has the following aspects.

A first aspect of the present invention is directed to an image processing apparatus which corrects a gray scale by extending part of a luminance level range of an input video luminance signal to a dynamic range of a processing system. This aspect of the invention includes a minimum value detecting means, a histogram detecting means, a minimum value correcting means, and a luminance signal correcting means The minimum value detecting means detects a minimum value of the input video luminance signal. The histogram detecting means detects luminance distribution information of the input video luminance signal. The minimum value correcting means obtains a corrected minimum value by correcting the minimum value detected by the minimum value detecting means based on the luminance distribution information detected by the histogram detecting means. The luminance signal correcting means extends the input video luminance signal so that the corrected minimum value obtained by the minimum value correcting means becomes a minimum value of the dynamic range of the processing system.

According to the above first aspect, the minimum value detected in the video luminance signal is corrected in accordance with the luminance distribution of the video luminance signal. Thus, it is possible to optimally adjust the gray scale in accordance with a displayed video without depending solely on the value of the detected minimum value.

In a second aspect of the present invention based on the first aspect, the luminance distribution information is an amount of distribution in a predetermined luminance range of a histogram distribution of the input video luminance signal.

According to the above second aspect, the amount of distribution in the predetermined luminance range of the histogram distribution of the video luminance signal is referred to. Thus, the characteristics of the display video can be appropriately determined.

In a third aspect of the present invention based on the second aspect, the predetermined luminance range is a luminance range in the histogram distribution corresponding to a minimum luminance part.

According to the above third aspect, the luminance range in the histogram distribution corresponding to the minimum luminance part of the video luminance signal is referred to. Thus, the characteristics in the vicinity of black of the displayed video can be easily determined.

In a fourth aspect of the present invention based on the first aspect, the luminance signal correcting means corrects the input video luminance signal in a luminance range to be smaller than a predetermined bend point.

According to the above fourth aspect, a luminance signal in a range smaller than the predetermined bend point is corrected. Thus, correction can be performed so that the gray scale especially in the vicinity of black is enhanced.

In a fifth aspect of the present invention based on the fourth aspect, the image processing apparatus further includes bend point correcting means which corrects the predetermined bend point in accordance with the luminance distribution information detected by the histogram detecting means.

According to the above fifth aspect, the bend point is corrected in accordance with the luminance distribution of the video luminance signal. Thus, the gray scale in the vicinity of black can be more optimally adjusted in accordance with a displayed video.

In a sixth aspect of the present invention based on the first aspect, wherein the minimum value detected by the minimum value detecting means is a minimum value of a signal obtained after the input video luminance signal is subjected to sampling or has been passed through a low-pass filter. Further, the minimum value correcting means obtains the corrected minimum value by correcting the minimum value detected by the minimum value detecting means in a decreasing direction based on the luminance distribution information detected by the histogram detecting means.

According to the above sixth aspect, the minimum value detected by the minimum value detecting means is corrected in a decreasing direction in accordance with the luminance distribution of the video luminance signal. Thus, a signal eliminated by sampling or a low-pass filter can be picked up, and degradation in image quality due to black crush can be avoided.

A seventh aspect of the present invention is directed to an image processing apparatus which corrects a gray scale by extending part of a luminance level range of an input video luminance signal to a dynamic range of a processing system. This aspect of the invention includes a maximum value detecting means, a histogram detecting means, a maximum value correcting means, and a luminance signal correcting means.

The maximum value detecting means detects a maximum value of the input video luminance signal. The histogram detecting means detects luminance distribution information of the input video luminance signal. The maximum value correcting means obtains a corrected maximum value by correcting the maximum value detected by the maximum value detecting means based on the luminance distribution information detected by the histogram detecting means. The luminance signal correcting means extends the input video luminance signal so that the corrected maximum value obtained by the maximum value correcting means becomes a maximum value of the dynamic range of the processing system.

According to the above seventh aspect, not only the maximum value detected in the video luminance signal but also the video luminance signal is corrected in accordance with the luminance distribution of the video luminance signal. Thus, the gray scale can be optimally adjusted in accordance with a displayed video without depending solely on the detected maximum value.

In an eighth aspect of the present invention based on the seventh aspect, the luminance distribution information is an amount of distribution in a predetermined luminance range of a histogram distribution of the input video luminance signal.

According to the above eighth aspect, the amount of distribution in the predetermined luminance range of the histogram distribution of the video luminance signal is referred to. Thus, the characteristics of the displayed video can be appropriately determined.

In a ninth aspect of the present invention based on the eighth aspect, the predetermined luminance range is a luminance range in the histogram distribution corresponding to a maximum luminance range.

According to the above ninth aspect, the luminance range in the histogram distribution corresponding to the maximum luminance range of the video luminance signal is referred to. Thus, the characteristics in the vicinity of white of the displayed video can be easily determined.

In a tenth aspect of the present invention based on the seventh aspect, the luminance signal correcting means corrects the input video luminance signal in a luminance range to be larger than a predetermined bend point.

According to the above tenth aspect, a luminance signal in a range larger than the predetermined bend point is corrected. Thus, correction can be performed so that the gray scale especially in the vicinity of white is enhanced.

In an eleventh aspect of the present invention based on the tenth aspect, the image processing apparatus further includes bend point correcting means which corrects the predetermined bend point in accordance with the luminance distribution information detected by the histogram detecting means.

According to the above eleventh aspect, the bend point is corrected in accordance with the luminance distribution of the video luminance signal. Thus, the gray scale in the vicinity of white can be more optimally adjusted in accordance with a displayed video.

In a twelfth aspect of the present invention based on the seventh aspect, the maximum value detected by the maximum value detecting means is a maximum value of a signal obtained after the input video luminance signal is subjected to sampling or been passed through a low-pass filter. Further, the maximum value correcting means obtains the corrected maximum value by correcting the maximum value detected by the maximum value detecting means in an increasing direction based on the luminance distribution information detected by the histogram detecting means.

According to the above twelfth aspect, the maximum value detected by the maximum value detecting means is corrected in an increasing direction in accordance with the luminance distribution of the video luminance signal. Thus, a signal eliminated by sampling or a low-pass filter can be picked up, and degradation in image quality due to white crush can be avoided.

A thirteenth aspect of the present invention is directed to an image processing apparatus which corrects a gray scale by extending part of a luminance level range of an input video luminance signal to a dynamic range of a processing system. This aspect of the invention includes a minimum and maximum value detecting means, a histogram detecting means, a minimum and maximum value correcting means, and a luminance signal correcting means.

The minimum value detecting means which detects a minimum value of the input video luminance signal. The maximum value detecting means detects a maximum value of the input video luminance signal. The histogram detecting means detects luminance distribution information of the input video luminance signal. The minimum value correcting means obtains a corrected minimum value by correcting the minimum value detected by the minimum value detecting means based on the luminance distribution information detected by the histogram detecting means. The maximum value correcting means obtains a corrected maximum value by correcting the maximum value detected by the maximum value detecting means based on the luminance distribution information detected by the histogram detecting means. The luminance signal correcting means extends the input video luminance signal so that the corrected minimum value obtained by the minimum value correcting means and the corrected maximum value obtained by the maximum value correcting means respectively become a minimum value and a maximum value of the dynamic range of the processing system.

According to the above thirteenth aspect, the minimum value and the maximum value detected in the video luminance signal are corrected in accordance with the luminance distribution of the video luminance signal. Thus, the gray scale can be optimally adjusted in accordance with the displayed video without depending solely on the detected minimum value and maximum value.

An fourteenth aspect of the present invention is directed to an image processing method of correcting a gray scale by extending part of a luminance level range of an input video luminance signal to a dynamic range of a processing system. This aspect of the invention includes a step detecting minimum value, a step detecting luminance distribution information, a step of obtaining a minimum corrected value, and a step of extending the input value luminance signal.

The minimum value detecting step of detecting a minimum value of the input video luminance signal. The histogram detecting step of detecting luminance distribution information of the input video luminance signal. The minimum value correcting step of obtaining a corrected minimum value by correcting the minimum value detected in the minimum value detecting step based on the luminance distribution information detected in the histogram detecting step. The luminance signal correcting step of extending the input video luminance signal so that the corrected minimum value obtained in the minimum value correcting step becomes a minimum value of the dynamic range of the processing system.

According to the above fourteenth aspect, the minimum value detected in the video luminance signal is corrected in accordance with the luminance distribution of the video luminance signal. Thus, it is possible to optimally adjust the gray scale in accordance with a displayed video without depending solely on the value of the detected minimum value.

A fifteenth aspect of the present invention is directed to an image processing method of correcting gray scale by extending part of a luminance level range of an input video luminance signal to a dynamic range of a processing system. This aspect of the invention includes a step of detecting a maximum value, a step of detecting luminance distribution information, a step of obtaining a maximum corrected value, and a step of extending the input video luminance signal. The maximum value detecting step of detecting a maximum value of the input video luminance signal. The histogram detecting step of detecting luminance distribution information of the input video luminance signal. The maximum value correcting step of obtaining a corrected maximum value by correcting the maximum value detected in the maximum value detecting step based on the luminance distribution information detected in the histogram detecting step. The luminance signal correcting step of extending the input video luminance signal so that the corrected maximum value obtained in the maximum value correcting step becomes a maximum value of the dynamic range of the processing system.

According to the above fifteenth aspect, not only the maximum value detected in the video luminance signal but also the video luminance signal is corrected in accordance with the luminance distribution of the video luminance signal. Thus, the gray scale can be optimally adjusted in accordance with a displayed video without depending solely on the detected maximum value.

A sixteenth aspect of the present invention is directed to an image processing method of correcting a gray scale by extending part of a luminance level range of an input video luminance signal to a dynamic range of a processing system. This aspect of the invention includes a step of detecting a minimum and maximum value, a step of detecting luminance distribution information, a step of obtaining a minimum and maximum corrected value, and a step of extending the input video luminance signal.

The minimum value detecting step of detecting a minimum value of the input video luminance signal. The maximum value detecting step of detecting a maximum value of the input video luminance signal. The histogram detecting step of detecting luminance distribution information of the input video luminance signal. The minimum value correcting step of obtaining a corrected minimum value by correcting the minimum value detected in the minimum value detecting step based on the luminance distribution information detected in the histogram detecting step. The maximum value correcting step of obtaining a corrected maximum value by correcting the maximum value detected in the maximum value detecting step based on the luminance distribution information detected in the histogram detecting step. The a luminance signal correcting step of correcting the input video luminance signal so that the corrected minimum value obtained in the minimum value correcting step and the corrected maximum value obtained in the maximum value correcting step respectively become a minimum value and a maximum value of the dynamic range of the processing system.

According to the above sixteenth aspect, the minimum value and the maximum value detected in the video luminance signal are corrected in accordance with the luminance distribution of the video luminance signal. Thus, the gray scale can be optimally adjusted in accordance with the displayed video without depending solely on the detected minimum value and maximum value.

BRIEF DESCRIPTION OF THE DRAWINGS

FIG. 3 is an illustration for describing detection results in a histogram detecting circuit 2 and how to calculate a corrected minimum value by a minimum value correcting circuit 6 based on the detection results.

FIG. 19 is an illustration showing an operation of a cyclic-type filter control circuit 32.

BEST MODE FOR CARRYING OUT THE INVENTION

With reference to the drawings, various embodiments of the present invention are described below.

First Embodiment

Figure 1:
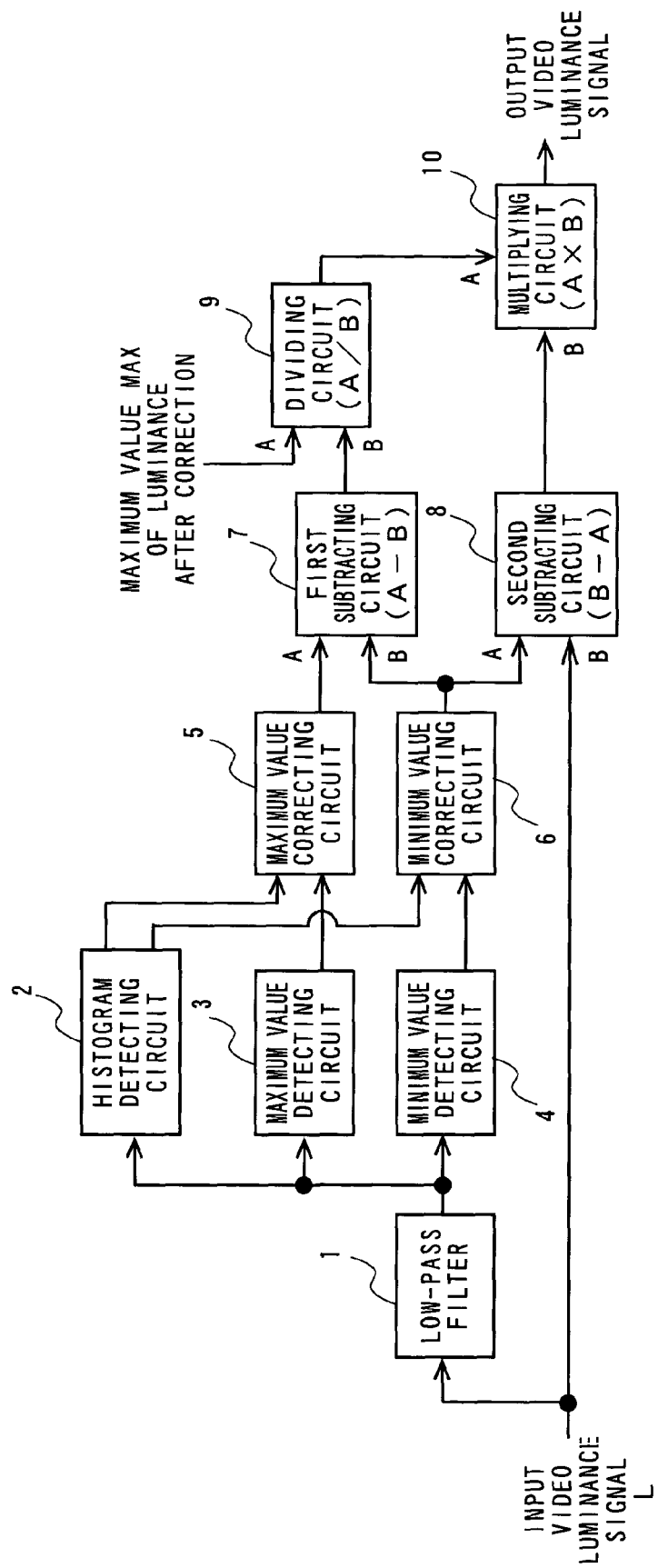
FIG. 1 is a block diagram illustrating the structure of an image processing apparatus according to a first embodiment of the present invention.

FIG. 1 is a block diagram illustrating the structure of an image processing apparatus according to a first embodiment of the present invention. In FIG. 1, the image processing apparatus includes a low-pass filter 1, a histogram detecting circuit 2, a maximum value detecting circuit 3, a minimum value detecting circuit 4, a maximum value correcting circuit 5, a minimum value correcting circuit 6, a first subtracting circuit 7, a second subtracting circuit 8, a dividing circuit 9, and a multiplying circuit 10.

The operation of the present embodiment is described below. First, an input video luminance signal is supplied to the low-pass filter 1. The low-pass filter 1 removes isolation point information from the input video luminance signal for output. The output signal is sampled in horizontal and vertical directions at respective appropriate sampling rates, and is then supplied to the histogram detecting circuit 2, the maximum value detecting circuit 3, and the minimum value detecting circuit 4. The histogram detecting circuit 2, maximum value detecting circuit 3, and minimum value detecting circuit 4 respectively detect, for each field, a maximum value Kmax, a minimum value Kmin, and information about distribution in a gray scale direction in a detection WINDOW set within a screen.

Note that the sampling rates may be discretely set so that, for example, sampling is performed for every horizontal four dots, for every vertical four lines, or for all pixels. Also, the detected values including the maximum value may be updated at a rate of each field or each frame, or a further slower rate. The detection WINDOW may be set so as not to include a black level unrelated to images (for example, black located at upper and lower portions of a wide screen movie) or a white level (subtitles in movies or the like).

The detected maximum value Kmax and minimum value Kmin are corrected in the maximum value correcting circuit 5 and the minimum value correcting circuit 6, respectively, based on the output results of the histogram detecting circuit 2, and are then outputted as a corrected maximum value Lmax and a corrected minimum value Lmin. This correcting operation is described further below. The input video luminance signal is corrected based on these corrected maximum value Lmax and corrected minimum value Lmin, and are then outputted as an output video luminance signal from the image processing apparatus. To describe more specifically, in the first subtracting circuit 7, based on the corrected maximum value Lmax and the corrected minimum value Lmin, (Lmax-Lmin) is calculated. In the dividing circuit 9, based on the calculation result (Lmax-Lmin) of the first subtracting circuit 7 and a maximum value MAX of a luminance signal after correction (a maximum value in a signal processing system), a division is performed as MAX/(Lmax-Lmin). In the second subtracting circuit 8, based on the input video luminance signal L and the corrected minimum value Lmin, an operation of (L Lmin) is calculated. In the multiplying circuit 10, based on an output of the dividing circuit 9 and an output of the second subtracting circuit 8, an operation of MAX/(Lmax-Lmin)×(L-Lmin) is calculated. This calculation result is output as an output video luminance signal.

Figure 2:
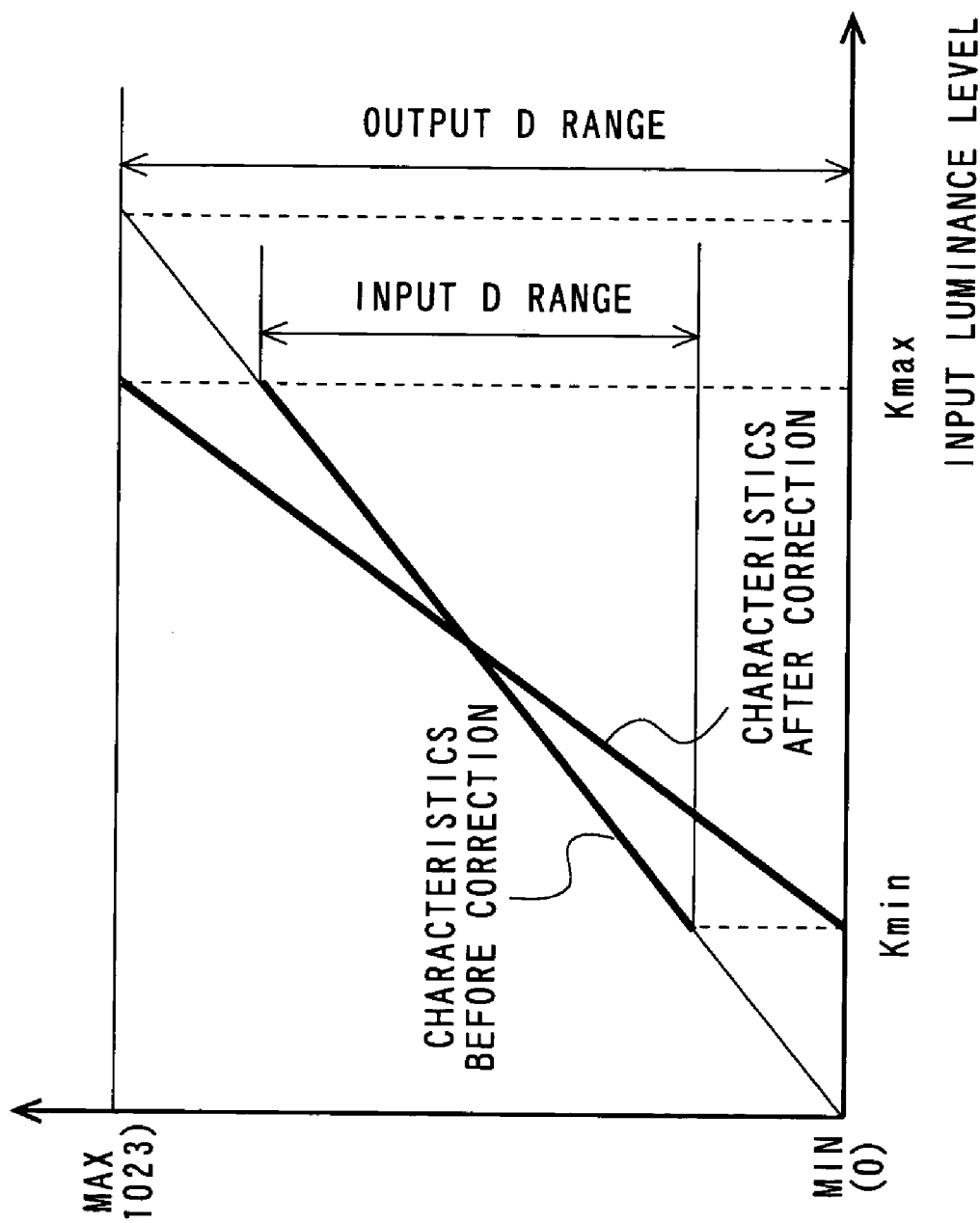
FIG. 2 is an illustration for describing a correcting operation of a conventional image processing apparatus.

Here, prior to descriptions of effects of correcting the gray scale in the present embodiment, a conventional method of correcting the gray scale is first described. FIG. 2 illustrates an input-output relationship in a conventional image processing apparatus. As illustrated in FIG. 2, in the conventional image processing apparatus, the detected maximum value Kmax and minimum value Kmin of the input video luminance signal are respectively extended to the maximum value MAX and a minimum value MIN of an output signal. The maximum value MAX is a maximum value of the dynamic range of the processing system (equivalent to 1023 in 10-bit processing), while the minimum value MIN is a minimum value of the dynamic range of the processing system (0, in general). Data at levels between the maximum value Kmax and the minimum value Kmin in the input video luminance signal are converted to data between the maximum value MAX and the minimum value MIN. With this, a signal using the entire dynamic range of the processing system is output for each field, for example. Therefore, the contrast of the displayed image can be enhanced. With this method, however, sufficient correction effects cannot be obtained if the detected maximum value Kmax approximately coincides with the maximum value MAX despite a dark scene, for example. Therefore, the image processing apparatus according to the present embodiment does not use the maximum value Kmax and the minimum value Kmin as they are, but uses the corrected maximum value Lmax and the corrected minimum value Lmin, which are obtained by optimally correcting the above values in accordance with the scene on the screen, for correcting the gray scale. The method of correcting the gray scale in the present embodiment is described below.

In the image processing apparatus according to the present embodiment, based on the maximum value Kmax and minimum value Kmin detected in the input video luminance signal, the corrected maximum value Lmax and the corrected minimum value Lmin are first calculated. How to calculate these corrected maximum value Lmax and corrected minimum value Lmin is described further below in detail. Then, as with the conventional method of correcting the gray scale, the input video luminance signal is corrected so that the corrected maximum value Lmax and the corrected minimum value Lmin are respectively extended to the maximum value MAX and the minimum value MIN of an output signal. This corresponds to the above-described operation of MAX/(Lmax-Lmin)×(L-Lmin).

Meanwhile, in the case as described above where the detected maximum value Kmax approximately coincides with the maximum value MAX despite a dark scene, evenly enhancing the entire contrast as in the conventional method is not particularly effective. Rather, with the contrast of a dark portion which occupies most of the screen being enhanced even by allowing white crush in a few bright parts, better video display on the screen can be achieved as a whole. In view of the above, the corrected maximum value Lmax and the corrected minimum value Lmin are calculated in the present embodiment.

A method of calculating the corrected maximum value Lmax and the corrected minimum value Lmin is specifically described below. First, in the histogram detecting section 2, histogram information is detected in an output signal of the low-pass filter 1. Hereinafter, a case where an amount of distribution n1 of a first part of a four-part split histogram is used as illustrated in FIG. 3(*a*) is exemplarily described. Based on the histogram information detected by the histogram detecting circuit 2, the maximum value correcting circuit 5 and the minimum value correcting circuit 6 correct the maximum value Kmax and the minimum value Kmin output from the maximum value detecting circuit 3 and the minimum value detecting circuit 4, respectively. Here, the minimum value correcting circuit 6 performs the correcting process so as to decrease the minimum value Kmin when the amount of distribution n1 of the first part of the four-part split histogram supplied as the histogram information by the histogram detecting circuit 2 is sufficiently large and, conversely, to increase the minimum value Kmin when n1 is sufficiently small. With this, black can be enhanced when a distribution of black is small, while the gray scale of black can be kept when the distribution of black is large. This correcting method is illustrated in FIG. 3(*b*). In FIG. 3(*b*), a converting function for the amount of distribution n1 and an amount of correction D (=the corrected minimum value Lmin-the minimum value Kmin) is represented as D=f(n1). This function should be optimized in accordance with a display device. Similarly, with regard to a gray scale of white, the correcting process is performed so as to increase the maximum value Kmax when an amount of distribution n4 of a fourth part of the four-part split histogram is sufficiently large and, conversely, to decrease the maximum value Kmax when n4 is sufficiently small.

Note that the histogram information is not restricted to the amount of distribution of the first and fourth parts of the four-part split histogram, and information other than the first and fourth can be referred to. Also, the number of splits of the histogram is not restricted to four, and the histogram can be more finely split into, for example, eight or sixteen. Furthermore, the correcting process with the histogram distribution information may be performed only on the minimum value or the maximum value. Still further, for the purpose of keeping a ratio of each color of RGB after correction constant, color-difference signals may be additionally corrected in proportion to the correction of the video luminance signal.

Figure 4:
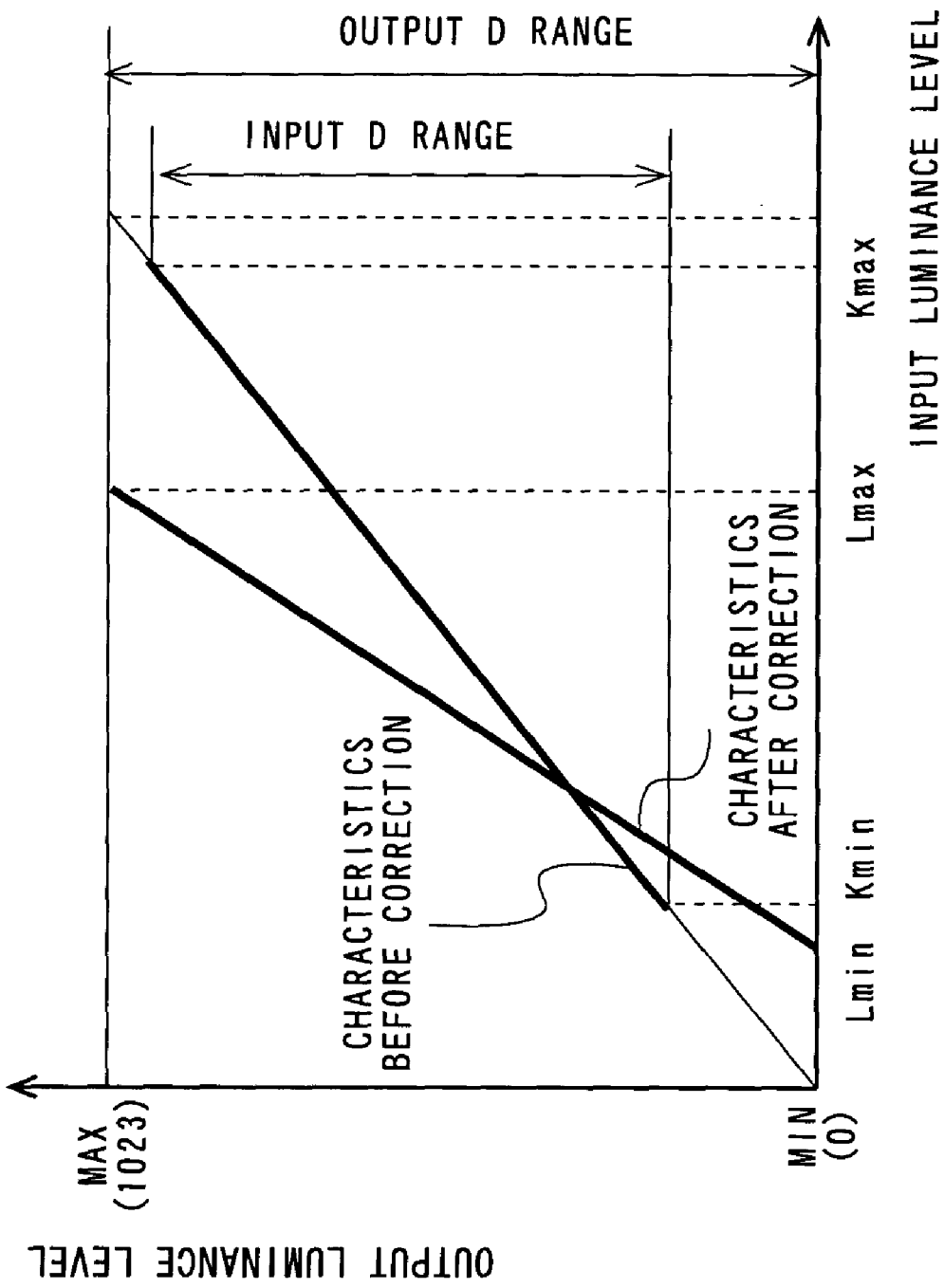
FIG. 4 is an illustration for describing a correcting operation in the first embodiment.

With the above-described operation of the image processing apparatus according to the present embodiment, sufficient gray-scale correction can be performed by making use of the dynamic range of the processing system within a luminance level range as illustrated in FIG. 4, where a large distribution of black that occupies most of the screen is observed, even in the case as described where the detected maximum value Kmax approximately coincides with the maximum value MAX despite a dark scene. Note that, with this correcting process, data between the corrected maximum value Lmax and the maximum value Kmax is output as the maximum value MAX, thereby causing white crush to occur. However, the amount of such data within that range is originally small. Therefore, by allowing this, better video display on the screen can be achieved as a whole.

Note that the correcting process in the present embodiment is performed such that, depending on the histogram information, the corrected minimum value Lmin may become smaller than the minimum value Kmin or the corrected maximum value Lmax may become larger than the maximum value Kmax. What this means is briefly described below.

In the present embodiment, the maximum value Kmax and the minimum value Kmin detected by the maximum value detecting circuit 3 and the minimum value detecting circuit 4 are a maximum value and a minimum value, respectively, of a signal obtained after information at an isolation point is removed to some degree from the original input video luminance signal by the low-pass filter 2 and then further sampling at a predetermined sampling rate is performed. Therefore, in the actual input video luminance signal, video information originally required may exist even if it is smaller than the minimum value Kmin illustrated in FIG. 4. The same goes for data that is larger than the maximum value Kmax. In such cases, with the conventional correcting method as illustrated in FIG. 2, for example, the data as described above is handled as data of the maximum value MAX or the minimum data MIN and, consequently, the gray-scale information is lost. However, when the scene is determined as being dark based on the histogram results as illustrated in FIG. 4, for example, if the corrected minimum value Lmin is made smaller than the minimum value Kmin, the video information originally required can be regarded although the corrected minimum value is smaller than the minimum value Kmin. Therefore, better image display can be performed in accordance with the scene.

Note that the correcting process of making the corrected minimum value Lmin smaller than the minimum value Kmin or making the corrected maximum value Lmax larger than the maximum value Kmax is meaningful because of the above-described reason. Therefore, such a correcting process is not especially meaningful if the maximum value detecting circuit 3 and the minimum value detecting circuit 4 are constructed so as to detect the maximum value Kmax and the minimum value Kmin by taking all video information originally required into consideration.

As described above, according to the first embodiment, a correcting process based on the histogram distribution information is performed for extending a maximum value and a minimum value of an input video luminance signal to a dynamic range. Therefore, optimal correction effects can be obtained in accordance with the scene. Also, problems that occur in the above correcting process, such as black crush and white crush, can be mitigated. Thus, the gray scale of black and white levels and the contrast can both be satisfied.

Second Embodiment

Figure 5:
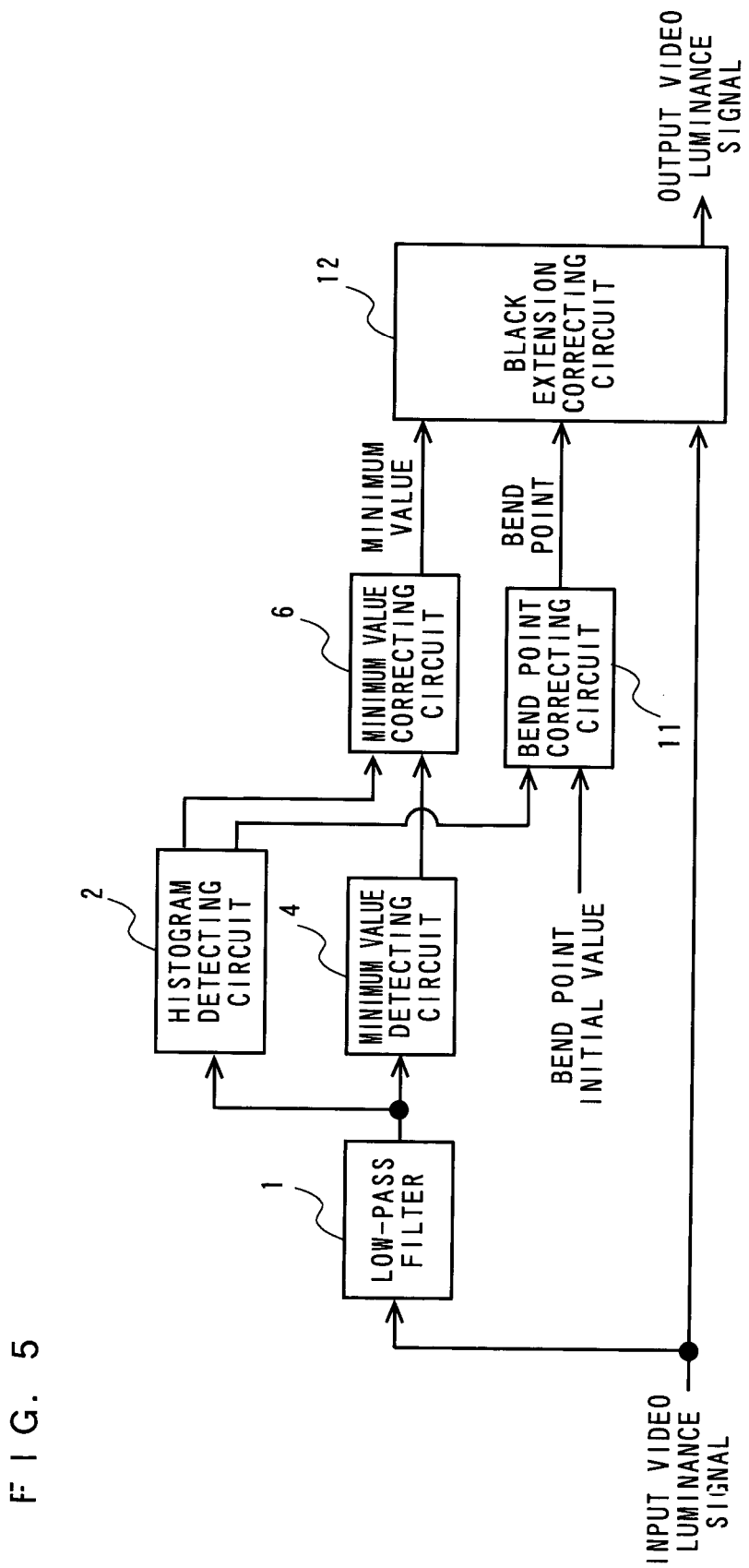
FIG. 5 is a block diagram illustrating the structure of an image processing apparatus according to a second embodiment of the present invention.

FIG. 5 illustrates the construction of an image processing apparatus according to a second embodiment of the present invention. Note that, in FIG. 5, components similar to those in the image processing apparatus illustrated in FIG. 1 are provided with the same reference numerals, and are not described herein.

Figure 6:
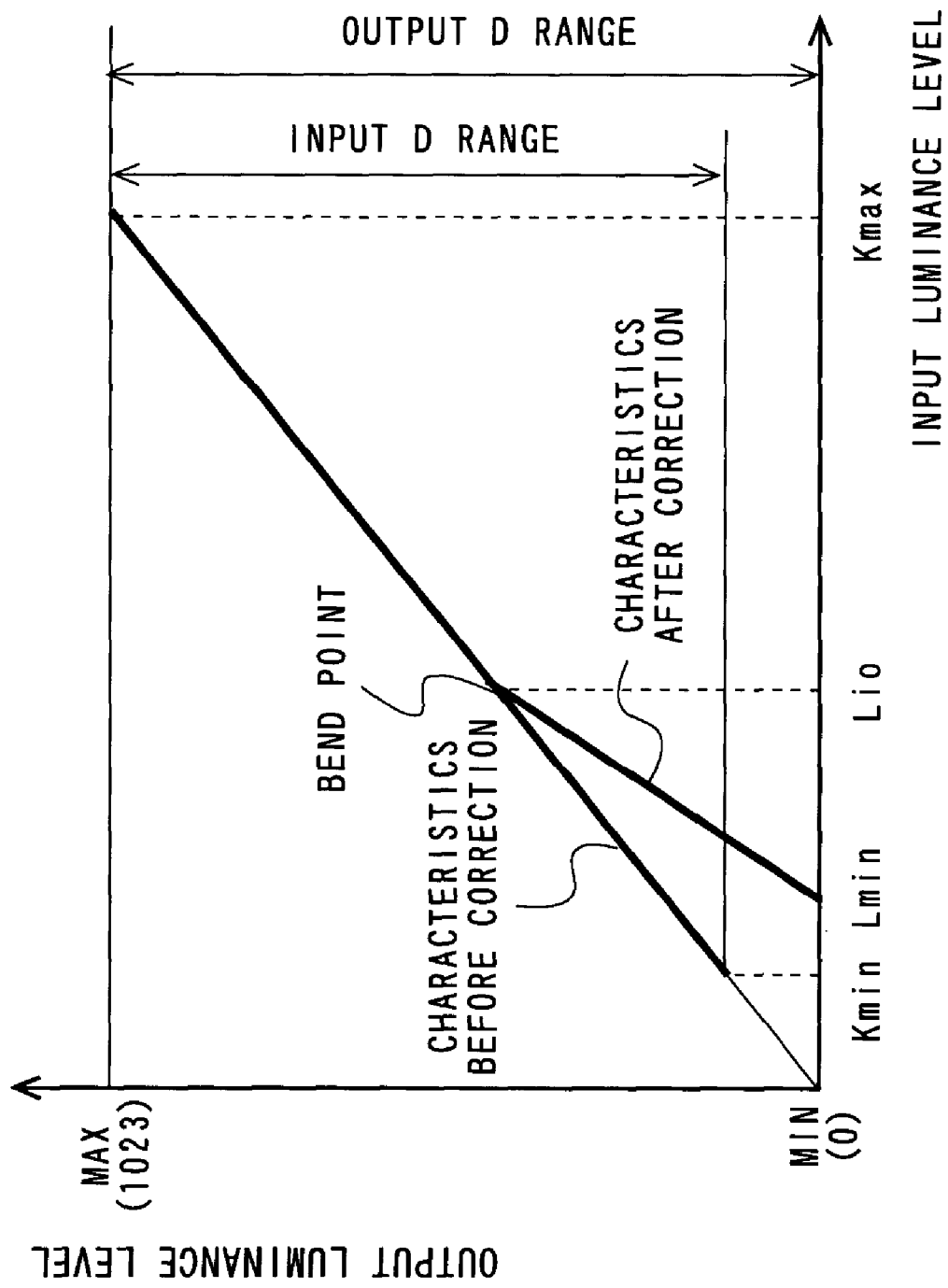
FIG. 6 is an illustration for describing a correcting operation of the second embodiment.

A concept of correcting the minimum value in the present embodiment is similar to that in the first embodiment. In addition, with a bend point correcting circuit 11, a bend point of black extension is corrected based on the histogram distribution information. The principle of operation of a black extension correcting circuit 12 is described with reference to FIG. 6. The black extension correcting circuit 12 is supplied with the minimum value Lmin in a detection WINDOW output from the minimum value correcting circuit 6 for each field, a bend point Lio obtained by correcting a bend point initial value Kio in the bend point correcting circuit 11, and an input video luminance signal. Based on the determination that a signal level smaller than the supplied Lmin does not exist, the black extension correcting circuit 12 extends a black level by bending a line representing a range below the bend point Lio, resulting in a line as illustrated in the drawing that represents characteristics after correction. This circuit can be achieved by hardware such as FPGA, or by software on a microcomputer, for example. Note that how to calculate the corrected minimum value Lmin is similar to that in the above-described first embodiment, and therefore is not described herein.

Figure 7:
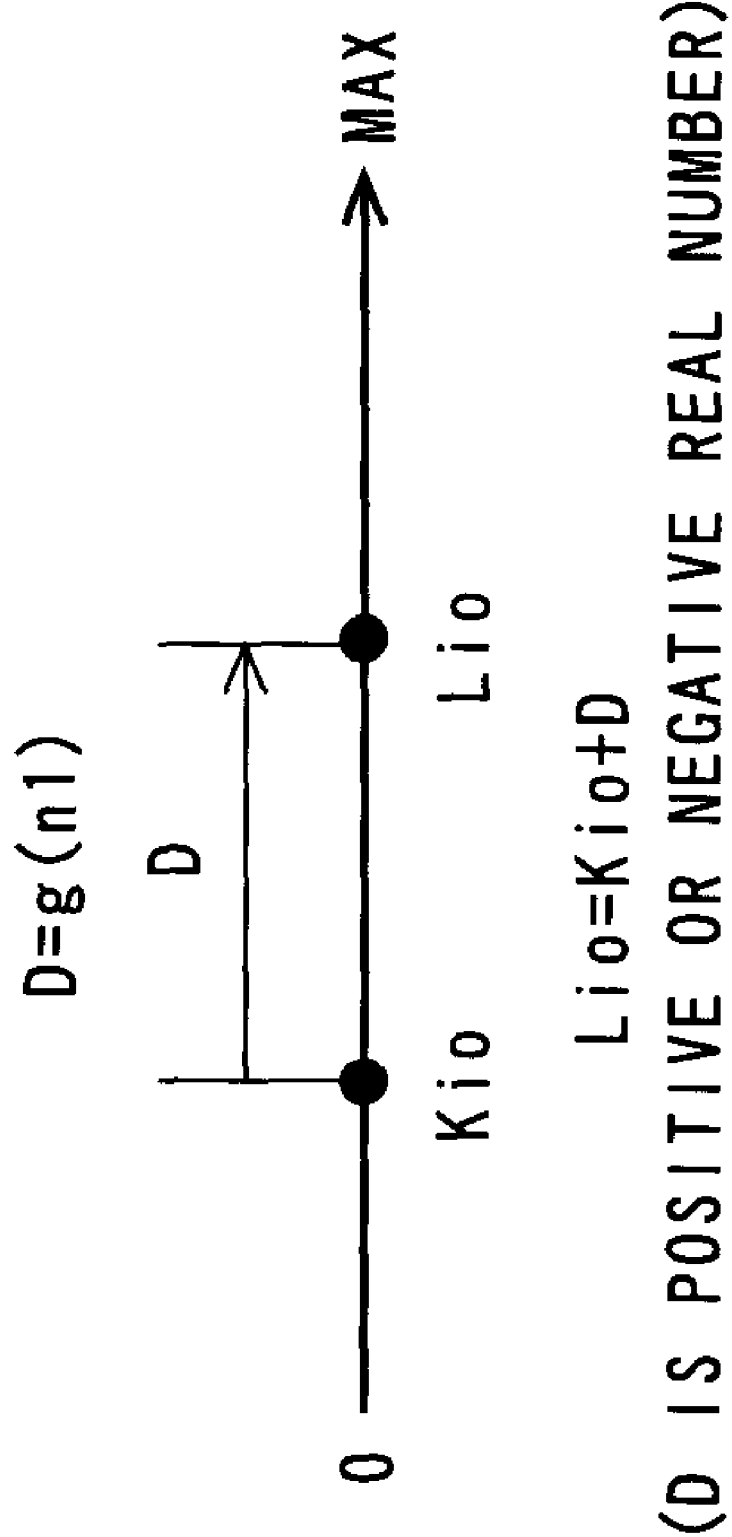
FIG. 7 is an illustration for describing how to calculate a bent point by a bent point correcting circuit 11.

The bend point correcting circuit 11 calculates an amount of correction D at the bend point as illustrated in FIG. 7, based on the distribution information detected by the histogram detecting circuit 2, such as the amount of distribution n1 of the first part of the four-part split histogram as illustrated in FIG. 3(a), for example. A function of $D=g(n1)$ should be optimized by considering the function in combination with the amount of correction of the minimum value in accordance with the display device.

In the present embodiment, the input video luminance signal is corrected with the above operation. For the purpose of keeping a ratio of each color of RGB after correction constant, color-difference signals may be additionally corrected in proportion to the correction of the video luminance signal.

As described above, according to the second embodiment, the minimum value is detected for each field. The detected minimum value is corrected based on the luminance distribution of that field. Further, the bend point for defining the range to be extended is also corrected based on the luminance distribution. Based on thus corrected minimum value and bend point, a process of correcting black extension is performed. Therefore, problems such as black crush that occurs at the time of correcting black extension can be mitigated, and the gray scale of the black level and the contrast can both be satisfied.

Third Embodiment

Figure 8:
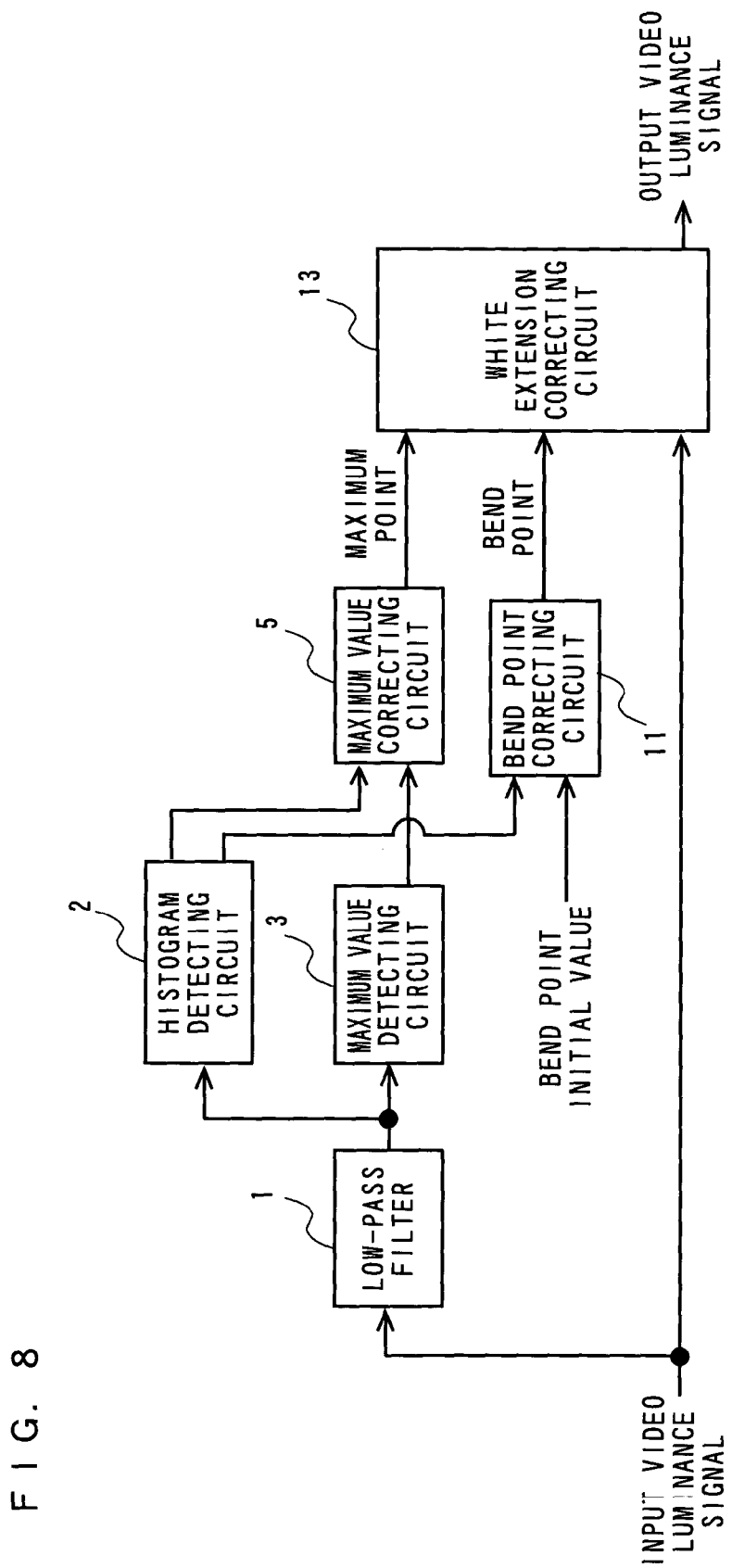
FIG. 8 is a block diagram showing the construction of an image processing apparatus according to a third embodiment of the present invention.

FIG. 8 illustrates the construction of an image processing apparatus according to a third embodiment of the present invention. Note that, in FIG. 8, components similar to those in the image processing apparatus illustrated in FIG. 1 or FIG. 5 are provided with the same reference numerals, and are not described herein.

Figure 9:
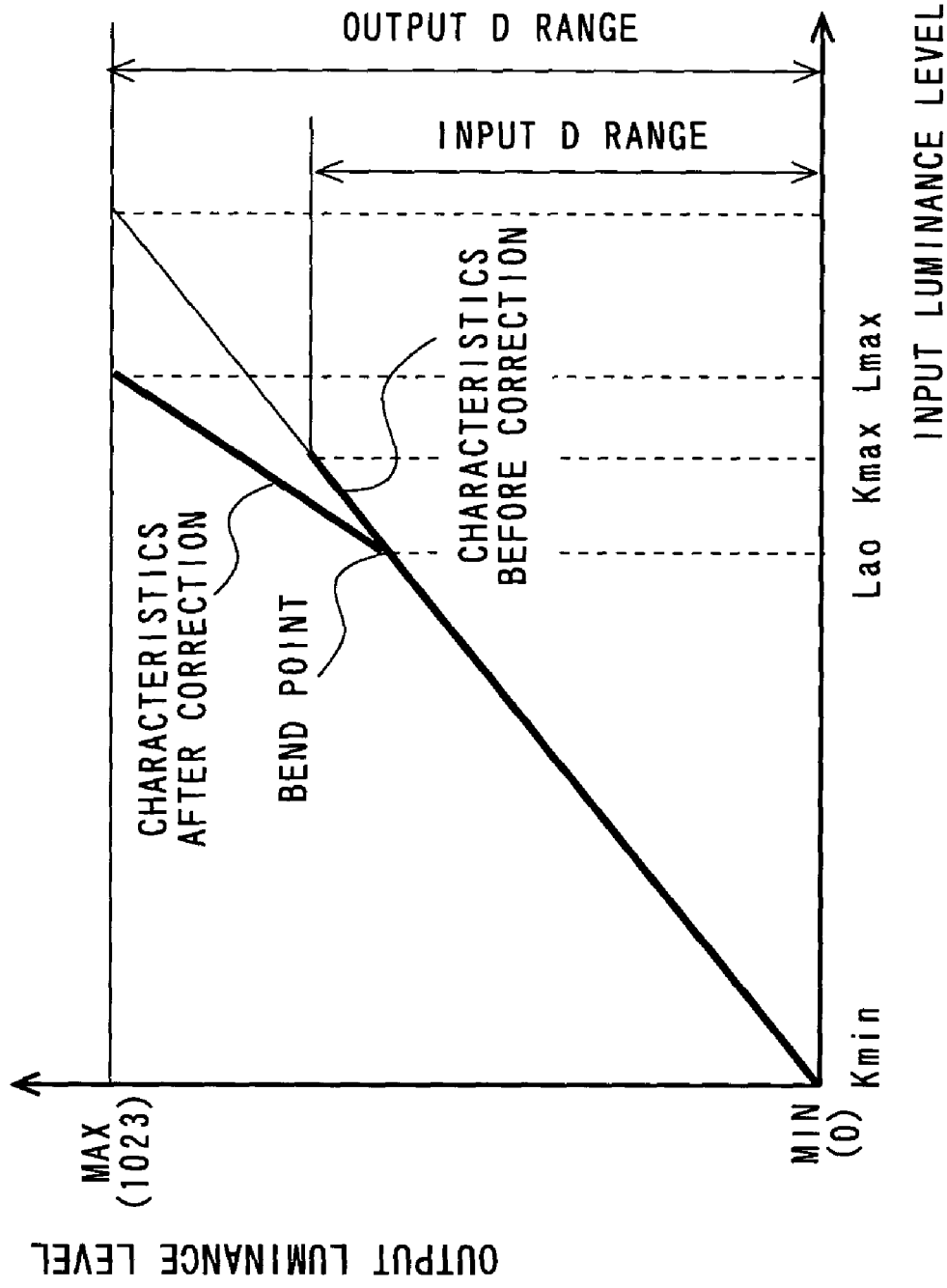
FIG. 9 is an illustration for describing a correcting operation in the third embodiment.

A concept of correcting the maximum value in the present embodiment is similar to that in the first embodiment. Also, a concept of correcting the bend point is similar to that in the second embodiment. The principle of operation of a white extension correcting circuit 13 is now described with reference to FIG. 9. The white extension correcting circuit 13 is supplied with the maximum value Lmax in a detection WINDOW output from the maximum value correcting circuit 5 for each field, a bend point Lao obtained by correcting a bend point initial value in the bend point correcting circuit 11, and an input video luminance signal. Based on the determination that a signal level larger than the supplied Lmax does not exist, the white extension correcting circuit 13 extends a white level by bending a line representing a range above the bend point Lao, resulting in a line as illustrated in the drawing that represents characteristics after correction. This circuit can be achieved by hardware such as FPGA, or by software on a microcomputer, for example. Note that how to calculate the corrected maximum value Lmax is similar to that in the above-described first embodiment, and therefore is not described herein.

The bend point correcting circuit 11 calculates a bend point based on distribution information detected by the histogram detecting circuit 2, such as, for example, the amount of distribution n4 of the fourth part of the four-part split histogram as illustrated in FIG. 3(a).

In the present embodiment, the input video luminance signal is corrected with the above operation. For the purpose of keeping a ratio of each color of RGB after correction constant, color-difference signals may be additionally corrected in proportion to the correction of the video luminance signal.

As described above, according to the third embodiment, the maximum value is detected for each field. The detected maximum value is corrected based on the luminance distribution of that field. Further, the bend point for defining the range to be extended is also corrected based on the luminance distribution. Based on thus corrected maximum value and bend point, a process of correcting white extension is performed. Therefore, problems such as white crush that occurs at the time of correcting white extension can be mitigated, and the gray scale of the white level and the contrast can both be satisfied.

Fourth Embodiment

Figure 10:
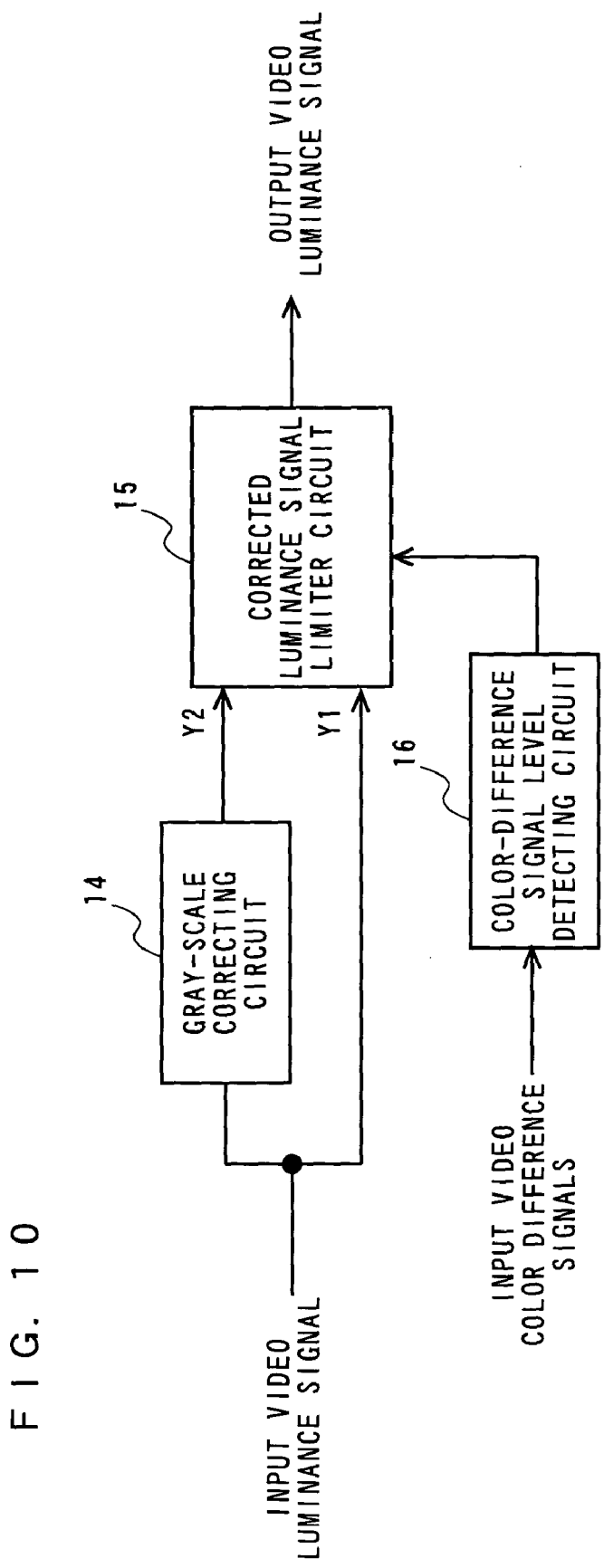
FIG. 10 is a block diagram illustrating an image processing apparatus according to a fourth embodiment of the present invention.

FIG. 10 illustrates the construction of an image processing apparatus according to a fourth embodiment of the present invention. In the present embodiment, an input video luminance signal is corrected and is then output as an output luminance signal. The image processing apparatus according to the present embodiment is especially applied to a case where video color-difference signals are also corrected based on the output luminance signal for image display. Furthermore, this is also applied to a case where these corrected video luminance signal and video color-difference signals are converted into RGB signals for image display. The operation in the present embodiment is described below.

The input video luminance signal is corrected by a gray-scale correcting circuit 14 so that a dynamic range is extended, such as black extension or white extension. Note that the image processing apparatuses according to the first to third embodiments can be used as the gray-scale correcting circuit 14. In general, if gain of a luminance signal has been corrected, gain of color-difference signals should also be corrected for each pixel in a similar manner to that of the luminance signal in order to keep a ratio of RGB after RGB signal conversion. At this time, if the degree of correcting a luminance signal Y is large, there is a problem at the time of correcting the color-difference signals U and V that at least one of the color-difference signals U and V become saturated so as to go over the dynamic range of the signal processing system. Even if any color-difference signal does not go over the dynamic range at the time of correction, there still is a problem at the time of converting the corrected YUV signals into RGB signals that at least one color of RGB is saturated to go over the dynamic range of the signal processing system. If any of the color-difference signals U and V and the RGB signals is saturated to go over the dynamic range of the signal processing system, original gray-scale information of data overflowed from the dynamic range is lost, and its color is crushed.

In the present embodiment, in order to get around the above problems, an input color-difference signal level is detected. When the color-difference signals U and V have values larger than a predetermined value, correction of the luminance signal is limited. This can avoid saturation of the corrected color-difference signals U and V and, furthermore, the RGB signals after RGB conversion.

Figure 11:
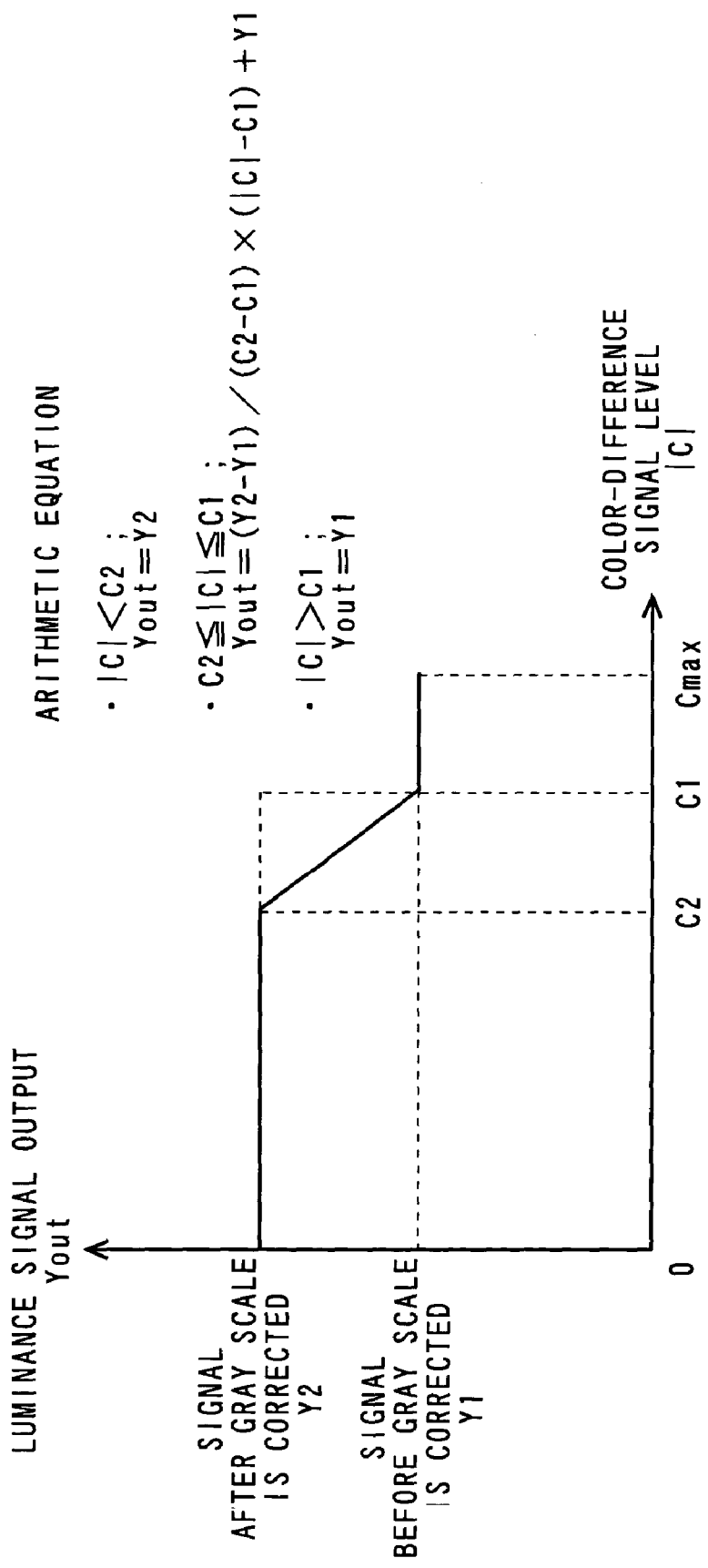
FIG. 11 is an illustration for describing an operation of a corrected luminance signal limiter circuit 15.

To do this, in a color-difference signal level detecting circuit 16, a component $|C|$ representing the magnitude of the input video color-difference signal is detected. This $|C|$ may be either one of the components representing the magnitudes of the U and V signals which is larger, or attention may focus only on one of the components representing the magnitudes of the U and V signals. A corrected luminance signal limiter circuit 15 outputs an output video luminance signal based on an input video luminance signal, which is a signal Y1 before gray-scale correction, a signal Y2 after gray-scale correction output from the gray-scale correcting circuit 14, and the detection results of the color-difference signal level detecting circuit 16. FIG. 11 illustrates a relation between the color-difference signal level $|C|$ supplied to the corrected luminance signal limiter circuit 15 and an output signal of the corrected luminance signal limiter circuit 15, that is, an output video luminance signal Yout. As illustrated in FIG. 11, in determining that the above-described saturation problem does not occur for a pixel that is within a range where the color-difference signal level $|C|$ is smaller than a threshold value C2, the corrected luminance signal limiter circuit 15 outputs a signal Y2 after gray-scale correction as it is as the correction result Yout. On the other hand, in determining that the above-described saturation problem occurs for a pixel that is within a range where the color-difference signal level $|C|$ is equal to or larger than the threshold value C2 and smaller than C1, the corrected luminance signal limiter circuit 15 outputs a signal at a level corresponding to the color-difference signal level $|C|$ from among levels from the signal Y2 after gray-scale correction to a signal Y1 after gray-scale correction. Specifically, for example, based on the signal Y1 before gray-scale correction, the signal Y2 after gray-scale correction, the color-difference signal level $|C|$, and the threshold values C1 and C2, what is output is the correction result Yout that satisfies $Yout=(Y2-Y1)/(C2-C1) \times (|C|-C1)+Y1$. On the other hand, when the color-difference signal level $|C|$ is equal to or larger than the threshold value C1, it is determined that the above-described saturation problem occurs, and what is output is the signal Y1 before gray-scale correction as it is, that is, a luminance signal of that pixel without correction.

Regarding the color-difference signals, a correcting process is performed thereon so as to satisfy the following: color-difference signals Cout after correction=color-difference signals Cin before correction×Yout/Y1, based on a ratio of the output video luminance signal Yout obtained by the image processing apparatus of the present embodiment and the input video luminance signal Y1. With this, the ratio of RGB is kept constant. When thus obtained output video luminance signal Yout and color-difference signals Cout (YUV) after correction are subjected to matrix conversion into RGB, any RGB alone does not go over the dynamic range of the signal processing system. Therefore, the above-described saturation problem can be avoided.

In the above descriptions of the present embodiment, the case has been described where a video signal is ultimately converted into RGB signals for image display. When image display is made by YUV signals, the input-output relation in the corrected luminance signal limiter circuit 15 illustrated in FIG. 11 is set to a degree such that at least U and V signals are not saturated.

In the present embodiment, the input-output relation in the corrected luminance signal limiter circuit 15 is as illustrated in FIG. 11. This is not meant to be restrictive. This input-output relation can be freely set as long as the above-described saturation problem can be avoided.

As described above, according to the fourth embodiment, in a case where a correcting process for extending the dynamic range of an input video luminance signal, such as black extension and white extension, is performed, when the results of this correction are used for correcting the color-difference signals, it is possible to avoid the color-difference signals after correction from being saturated to go over the dynamic range of the signal processing system. Furthermore, also when the corrected luminance signal and color-difference signals are converted into RGB signals for image display, it is possible to avoid the RGB signals from being saturated to go over the dynamic range of the signal processing system. Therefore, problems such as color crush due to luminance correction can be avoided, and degradation in display quality due to gray-scale correction can be prevented.

Fifth Embodiment

A fifth embodiment is directed to a case where, for example, a maximum value of the input video luminance signal has to be obtained for gray-scale correction (by way of example, a case where the white extension correcting circuit 13 illustrated in FIG. 8 is used for gray-scale correction, etc.). In this case, a level of information such as white characters or the like included in the input video luminance signal is provisionally replaced by a level smaller than a maximum value of the original image, and then a maximum value is detected, thereby detecting the true maximum value of the original image.

Figure 12:
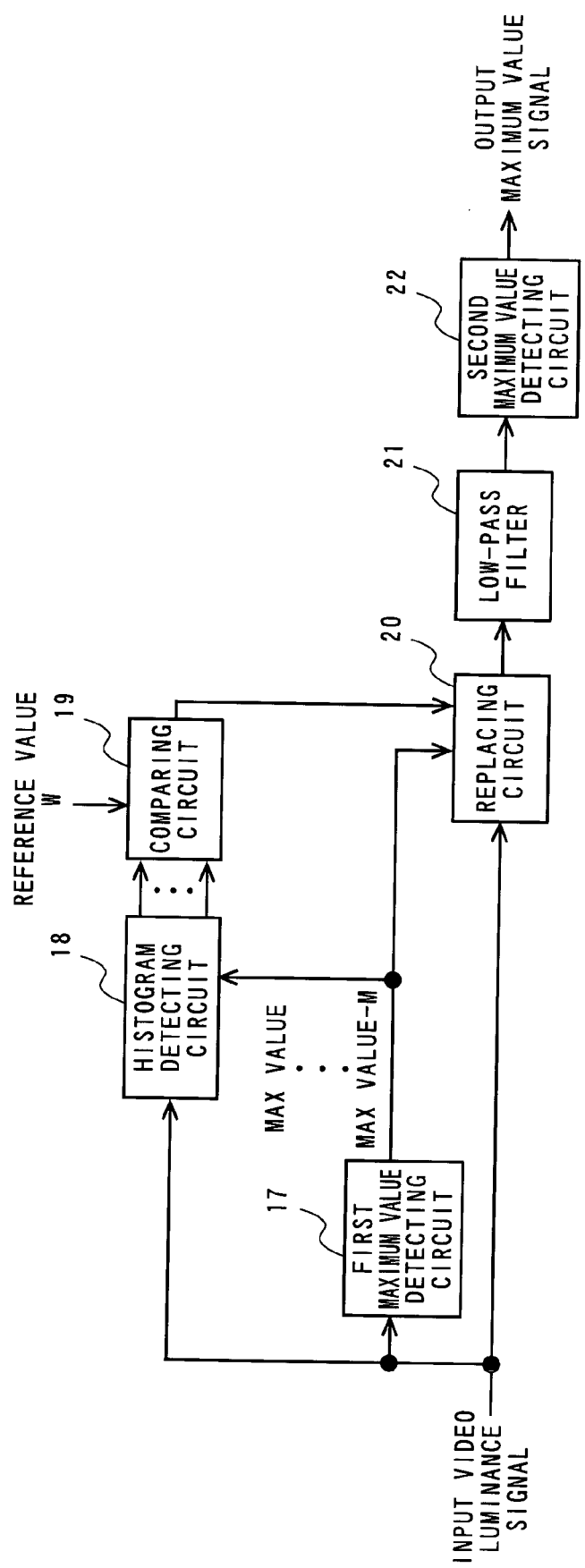
FIG. 12 is a block diagram illustrating the structure of an image processing apparatus according to a fifth embodiment of the present invention.

FIG. 12 is a block diagram illustrating the construction of an image processing apparatus according to the fifth embodiment of the present invention. The image processing apparatus includes a first maximum value detecting circuit 17, a histogram detecting circuit 18, a comparing circuit 19, a replacing circuit 20, a low-pass filter 21, and a second maximum value detecting circuit 22. The operation in the fifth embodiment is described below.

The image processing apparatus is supplied with an input video luminance signal. This input video luminance signal is supplied to the first maximum value detecting circuit 17, the histogram detecting circuit 18, and the replacing circuit 20. Based on the input video luminance signal, the first maximum value detecting circuit 17 detects a maximum value of a luminance level within a display area for each field or each frame. Then, luminance level values between the detected maximum value (hereinafter referred to as MAX value) and the MAX value –M are output to the histogram detecting circuit 18 and the replacing circuit 20. The value of M should be optimally set in accordance with the luminance width of white characters desired to be detected and, in general, is an integer of the range of 2 to 5.

Figure 13:
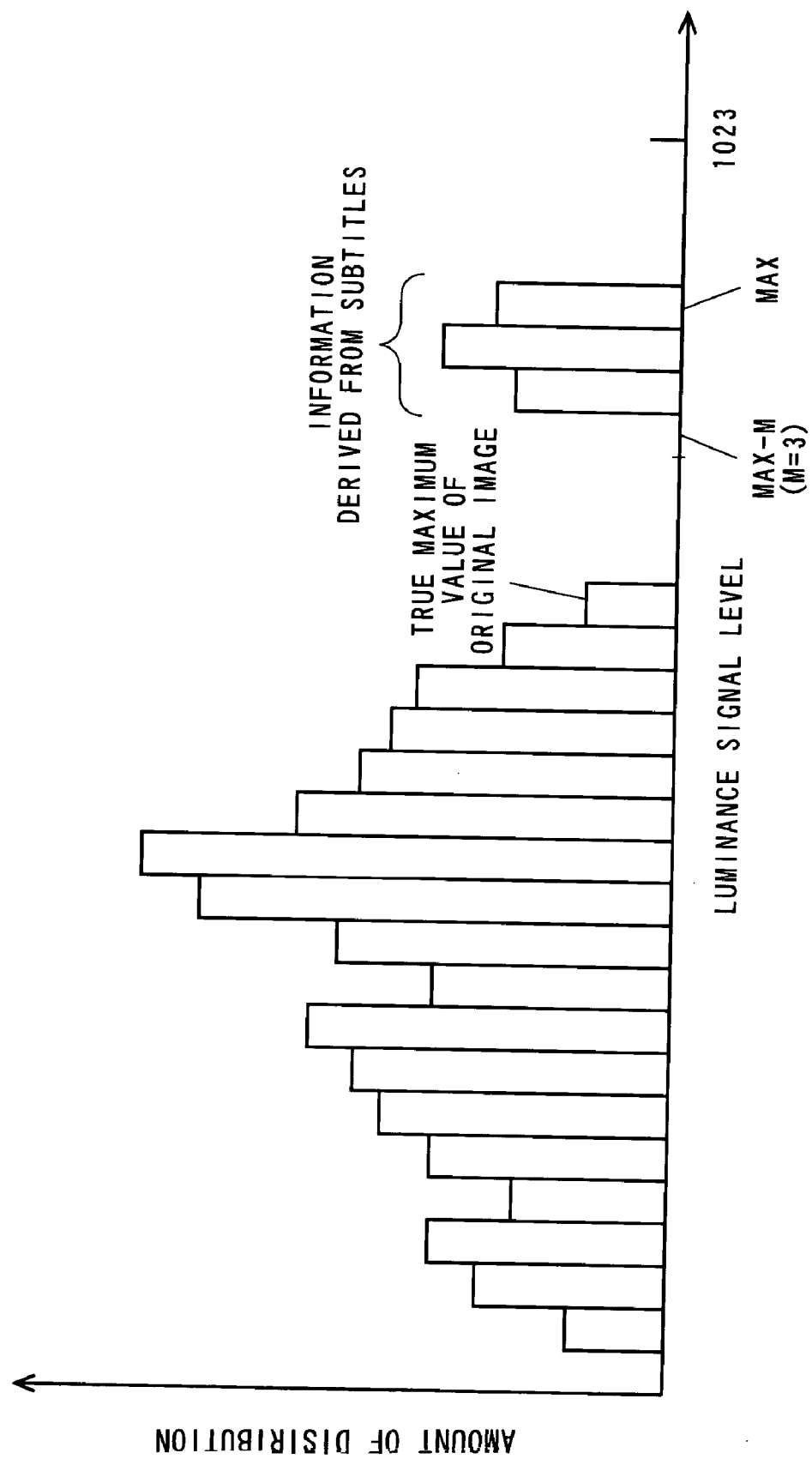
FIG. 13 is an illustration for describing a mechanism of detecting information derived from subtitles in the fifth embodiment.

The histogram detecting circuit 18 detects luminance distribution information of the input video luminance signal, and then outputs, to the comparing circuit 19, an amount of distribution of the input video luminance signal at each luminance level from the MAX value to the MAX value –M supplied by the first maximum value detecting circuit 17. The comparing circuit 19 calculates a difference in the amount of distribution between the adjacent luminance levels, and when the difference in the amount of distribution is larger than an externally set reference value W, outputs information indicating such. This detection of a large difference in the amount of distribution means detection of white characters such as subtitles. When an image including white characters such as subtitles is supplied, as illustrated in FIG. 13, distribution can be observed as having some luminance level width away from the original image information. In the present embodiment, by using such characteristics of the luminance levels of an image including white characters, the white characters are detected.

A process of detecting the white characters is specifically described below by taking an exemplary case where the above M is 3. Output from the histogram detecting circuit 18 are: an amount of distribution of the MAX value, an amount of distribution of (MAX value −1), an amount of distribution of (MAX value −2), and an amount of distribution of (MAX value −3). Based on these amounts of distribution, the comparing circuit 19 calculates: an amount of distribution obtained by the amount of distribution of the MAX value− (MAX value −1) (hereinafter, DEMAX1); an amount of distribution obtained by the amount of distribution of (MAX value −1)−(MAX value −2) (hereinafter, DEMAX2); and an amount of distribution obtained by the amount of distribution of (MAX value −2)−(MAX value −3) (hereinafter, DEMAX3). When a difference exceeding the externally set reference value W is detected, it is determined that this represents outstanding information unrelated to the video, such as white characters unrelated to the video. Since white character information and original image information that is immediately below in luminance level has a difference, it is determined that the difference represents white characters. If the above DEMAX3 is sufficiently large so as to go over the reference value W, this information is output from the comparing circuit 19 to the replacing circuit 20, where it is determined that the MAX value, the MAX value −1, and the MAX value −2 represent white character information, and the signal levels of these are replaced by sufficiently small levels. The levels for use in replacing can be 0 if gray-scale correction is not performed in the vicinity of black, and can be intermediate luminance levels if black correction is performed. An output of the replacing circuit 20 is supplied to the low-pass filter 21 for eliminating isolation point information, where the output is subjected to filter processing, and is then supplied to the second maximum value detecting circuit 22, where a maximum value of the displayed image is detected for each field or each frame. In this manner, an output maximum value signal is output. As such, white characters are detected and then replaced by those at sufficiently low luminance levels, and a maximum value is again detected, thereby enabling the true maximum value of the original image to be detected.

Note that, although 3 is used as the above value of M in the present invention, the value should be optimally set depending on the luminance width of white characters desired to be detected. Furthermore, the reference value W should also be set depending on the luminance level of the white characters desired to be detected. The low-pass filter 21 may perform filter processing in only either one of horizontal and vertical directions, or may perform filter processing in both directions.

Figure 14:
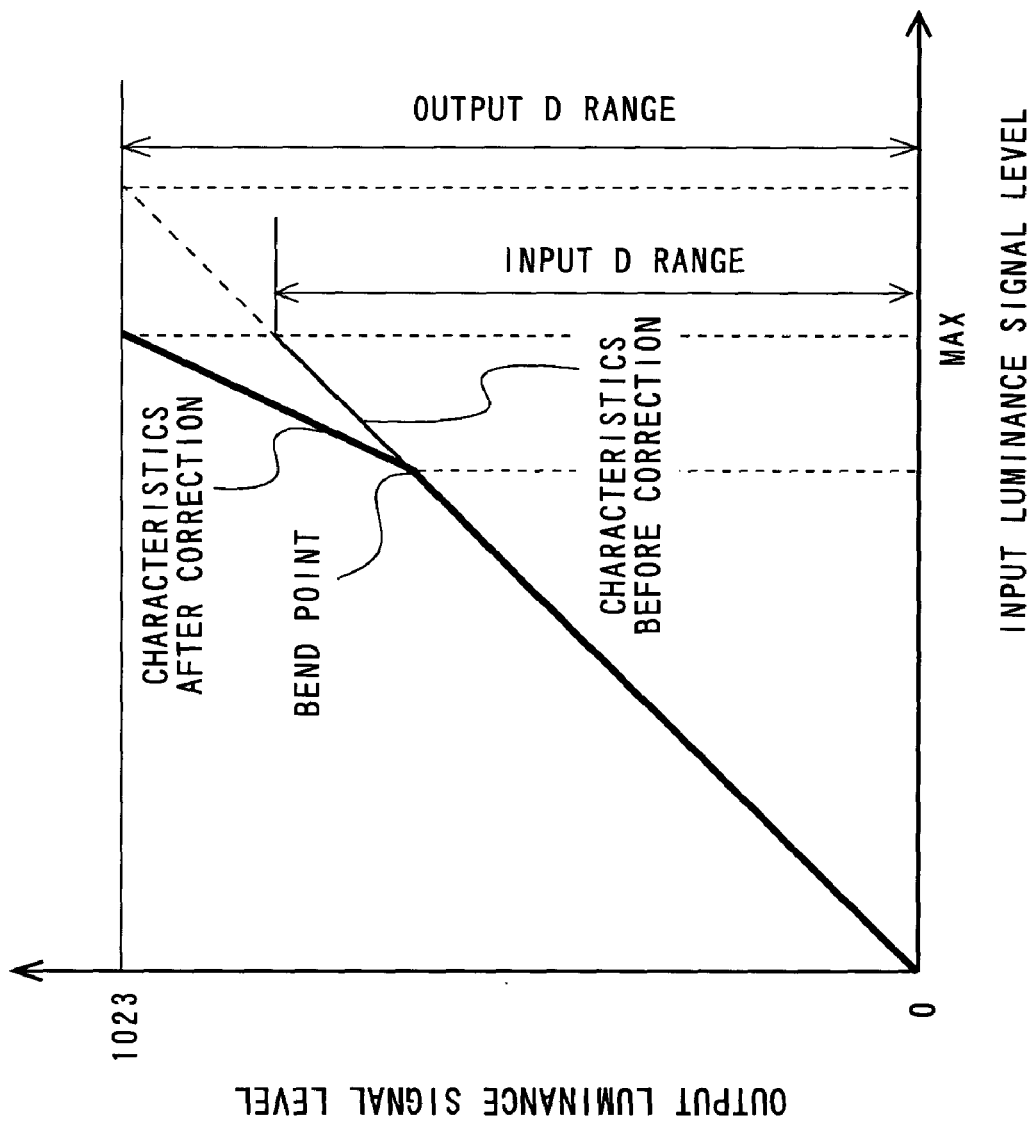
FIG. 14 is an illustration showing an example of a gray-scale correction algorithm capable of suitably using the image processing apparatus according to the fifth embodiment.

An example of gray-scale correction using the maximum value detected by the present embodiment is described with reference to FIG. 14. In the gray-scale correction illustrated in FIG. 14, a bend point is optimally set, and correction is performed so that the detected MAX value becomes a maximum value of the dynamic range of the signal processing system. As for a gray scale from the bend point to the MAX value, correction is performed so that a line can be drawn from the corrected maximum value to the bend point. With this correction, a gray scale larger than the maximum value, which would not have been originally used, can be effectively used. That is, as illustrated in FIG. 14, an input D range is extended to an output D range. In such white extension correction, when the detected MAX value is larger than that of the original image due to white character information or the like, a gray scale to be extended becomes smaller, and therefore correction effects are reduced.

As described above, according to the fifth embodiment, even when the video signal includes information such as white characters, the true maximum value of the original image can be detected. Therefore, by using the maximum value obtained by the present embodiment, it is possible to effectively operate gray-scale correction such as white extension as illustrated in FIG. 14.

In the present embodiment, as illustrated in FIG. 13, information such as white characters is determined based on the magnitude of the difference in the amount of distribution between adjacent luminance levels. This is not meant to be restrictive. For example, as illustrated in FIG. 13, information such as white characters can be determined based on the fact that the amount of distribution of the signal becomes 0 at a level of the MAX value –M. Other than this example, various schemes can be thought of. However, when it is determined whether the amount of distribution is 0, erroneous determination may occur due to information such as noise. Nevertheless, by making this determination based on the difference in the amount of distribution as in the present embodiment, a more accurate determination is possible without being affected by noise or the like.

In the present embodiment, information such as white characters is determined based on the amount of distribution of the luminance signal from the MAX value detected by the first maximum value detecting circuit 17 to a luminance level that is M levels away from the MAX value. However, if determination of white characters, etc., is made irrespective of the MAX value or the value of M, it is highly possible that information of the original image other than the white characters is erroneously determined as white characters. In a sense that such erroneous determination should be avoided, the value of M is preferably set to a value closer to the width of luminance distribution of the white characters to be detected.

Sixth Embodiment

A sixth embodiment is directed to a case where, for example, a minimum value of an input video luminance signal has to be obtained for use in gray-scale correction (by way of example, a case where the black extension correcting circuit 12 illustrated in FIG. 5 is used for gray-scale correction, etc). In this case, blanking included in the input video luminance signal or information such as black portions located at upper and lower portions of a cinema source is provisionally replaced by information at a level larger than a minimum value of the original image, and then a minimum value is detected, thereby detecting the true minimum value of the original image.

Figure 15:
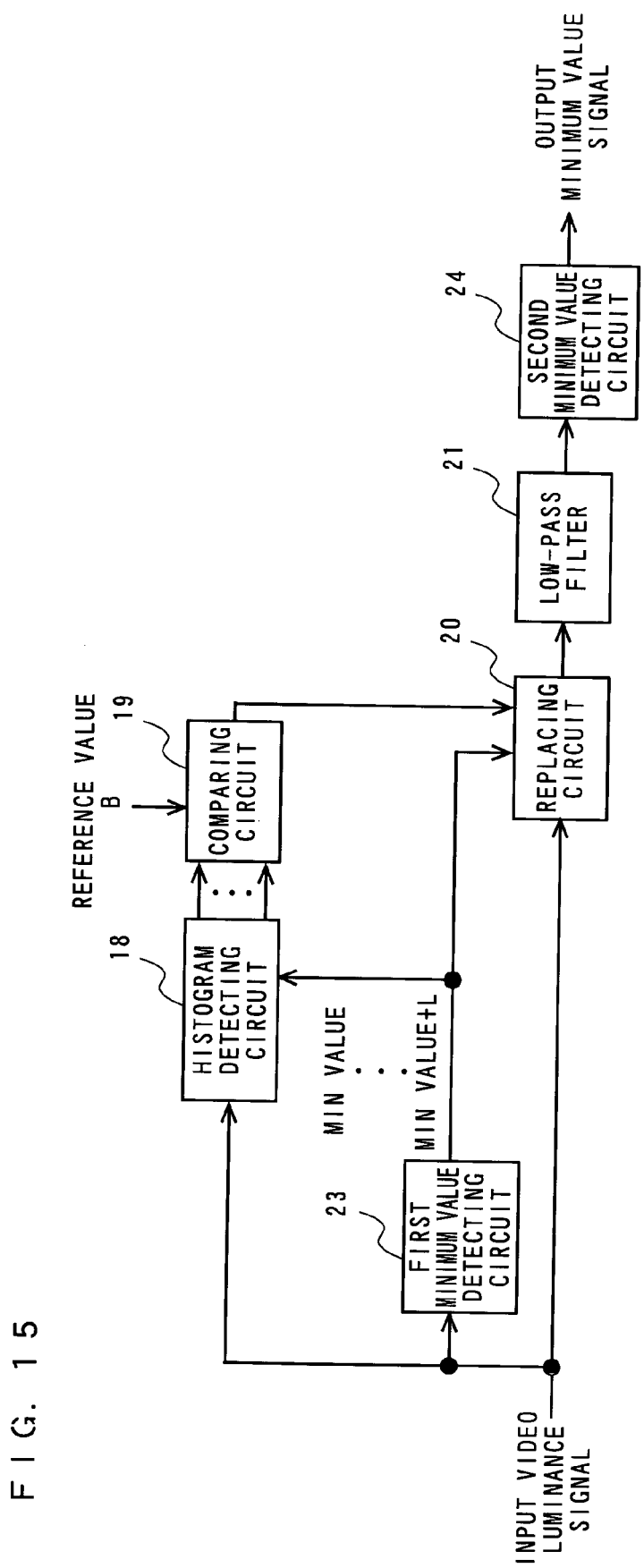
FIG. 15 is a block diagram illustrating the structure of an image processing apparatus according to a sixth embodiment of the present invention.
Figure 16:
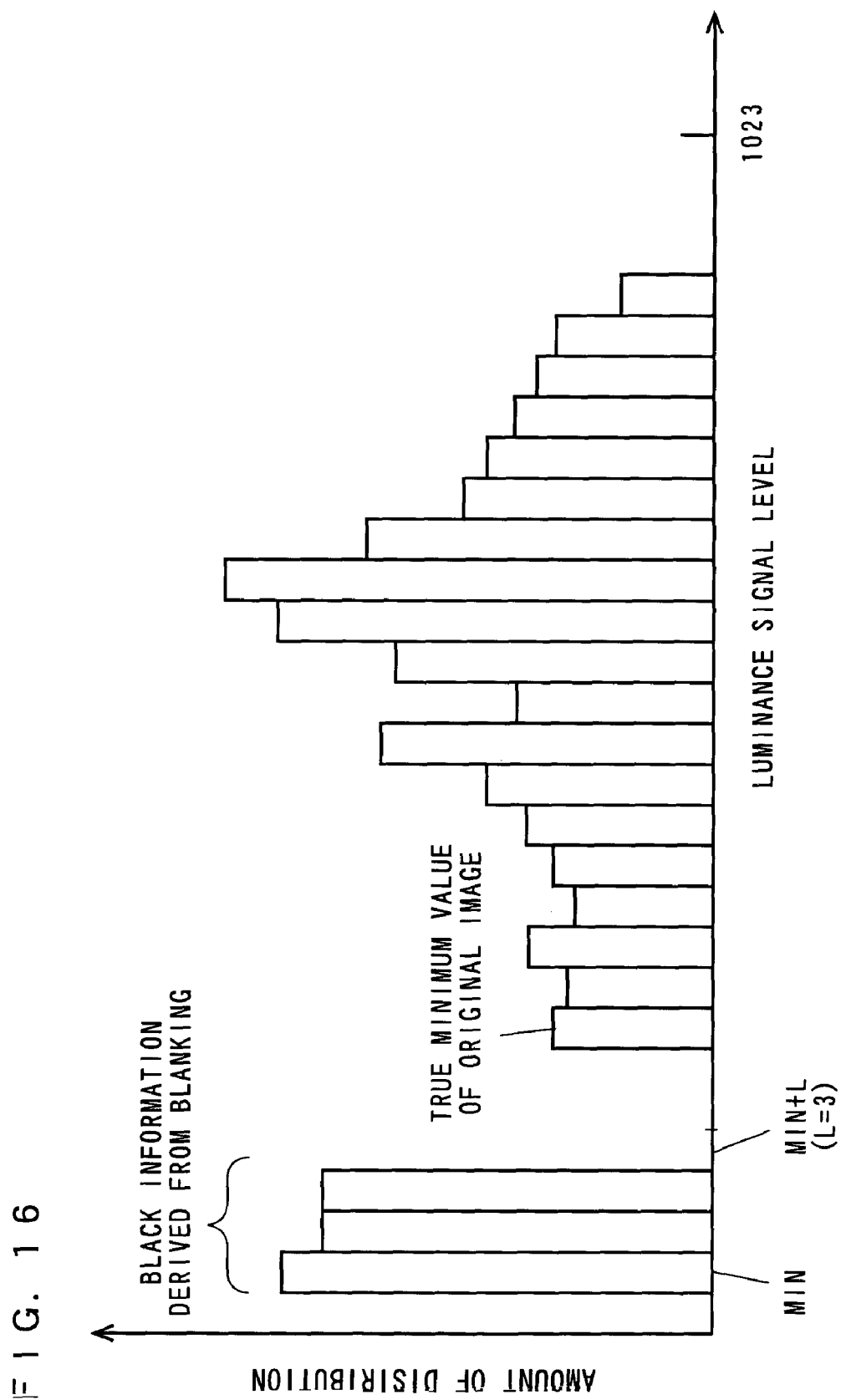
FIG. 16 is an illustration for describing a mechanism of detecting black information derived from blanking, etc., in the sixth embodiment.

FIG. 15 is a block diagram illustrating the construction of an image processing apparatus according to the sixth embodiment of the present invention. Note that, in FIG. 15, components identical to those of the fifth embodiment illustrated in FIG. 12 are provided with the same reference numerals, and are not described herein. In the present embodiment, an input video luminance signal is supplied to a first minimum value detecting circuit 23 and the histogram detecting circuit 18. The first minimum value detecting circuit 23 detects a minimum value within a display area for each field or each frame. At this time, the first minimum value detecting circuit 23 outputs, in addition to a minimum value (hereinafter, MIN value), values up to the MIN value +L to the histogram detecting circuit 18 and the replacing circuit 20. L is an integer of the range of 2 to 5. The histogram detecting circuit 18 detects luminance distribution information of the input video luminance signal, and then outputs an amount of distribution from the MIN value to the MIN value +L supplied by the first minimum value detecting circuit 23 to the comparing circuit 19. The comparing circuit 19 calculates a difference in the amount of distribution between adjacent luminance levels at luminance levels supplied by the histogram detecting circuit 18. If the calculation result is greatly varied from a reference value B that can be externally set, information indicating as such is output to the replacing circuit 20. This large variation means detection of a luminance level unrelated to the information of the original image and representing blanking or black portions located at upper and lower portions of a cinema source. When information such as blanking is included in the video signal, this black information is distributed as having some luminance level width away from the original image.

A process of detecting this black information is specifically described by taking an exemplary case where the above L value is 3. The comparing circuit 19 calculates: an amount of distribution obtained by the amount of distribution of the MIN value–(MIN value +1) (hereinafter, DEMIN1); an amount of distribution obtained by the amount of distribution of (MIN value +1)–(MIN value +2) (hereinafter, DEMIN2); and an amount of distribution obtained by the amount of distribution of (MIN value +2)–(MIN value +3) (hereinafter, DEMIN3). When a difference exceeding the externally set reference value B set is detected, it is determined that this represents outstanding information unrelated to the video, that is, information unrelated to the video such as blanking parts. If the above DEMIN3 is sufficiently large so as to go over the reference value B, this information is output from the comparing circuit 19 to the replacing circuit 20. The replacing circuit 20 determines that luminance level signals from the MIN value to the MIN value +2 represent black information unrelated to the video such as blanking, and replaces them by those at any sufficiently large luminance levels. The levels for use in replacing can be a value of 1023 (10-bit processing) if gray-scale correction is not performed in the vicinity of white, and can be intermediate luminance levels if white correction is performed. An output of the replacing circuit 20 is supplied to the low-pass filter 21 for eliminating isolation point information, where the output is subjected to filter processing, and is then supplied to a second minimum value detecting circuit 24. In the second minimum value detecting circuit 24, a minimum value of the displayed image is detected for each field or each frame. In this manner, an output maximum value signal is output.

According to the sixth embodiment, as in the above example, black levels unrelated to the original image are detected and then replaced by sufficiently high luminance levels, and a minimum value is again detected, thereby enabling the true minimum value of the original image to be detected.

Note that, although 3 is used as the above value of L in the present example, the value should be optimally set depending on variations in black level of a blanking part to be detected. Furthermore, the reference value B should also be set depending on the black level desired to be detected. The low-pass filter 21 may perform filter processing in only either one of horizontal and vertical directions, or may perform filter processing in both directions.

Figure 17:
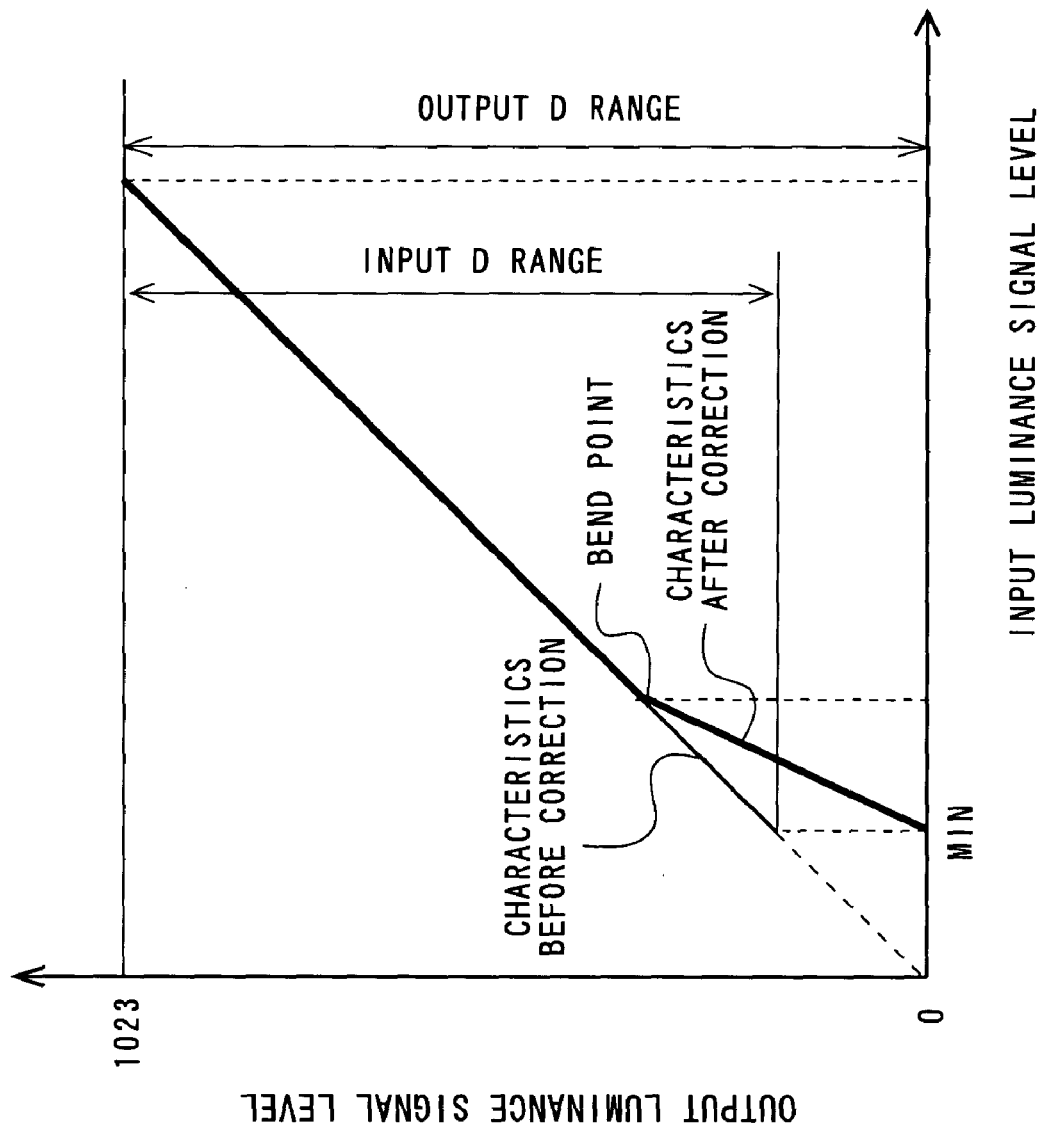
FIG. 17 is an illustration showing an example of a gray-scale correction algorithm capable of suitably using the image processing apparatus according to the sixth embodiment.

An example of gray-scale correction using the minimum value detected by the image processing apparatus of the present embodiment in the above manner is described with reference to FIG. 17. In the gray-scale correction illustrated in FIG. 17, a bend point is optimally set, and correction is performed so that the detected MIN value becomes a minimum value of the dynamic range of the signal processing system (0, in general). As for a gray scale from the bend point to the MIN value, correction is performed so that a line can be drawn from the corrected minimum value (0, in general) to the bend point. With this correction, a gray scale smaller than the maximum value, which would not have been originally used, can be effectively used. That is, as illustrated in FIG. 17, an input D range is extended to an output D range. In such black extension correction, when the detected MIN value is smaller than that of the original image due to erroneous detection of, for example, black in a blanking part, a gray scale to be extended becomes less, and therefore correction effects are reduced.

As described above, according to the sixth embodiment, the true minimum value of the original image can be detected. Therefore, even when the video signal includes black information such as blanking, the use of the minimum value obtained by the present embodiment enables gray-scale correction such as black extension as illustrated in FIG. 17 to effectively operate.

Seventh Embodiment

Figure 18:
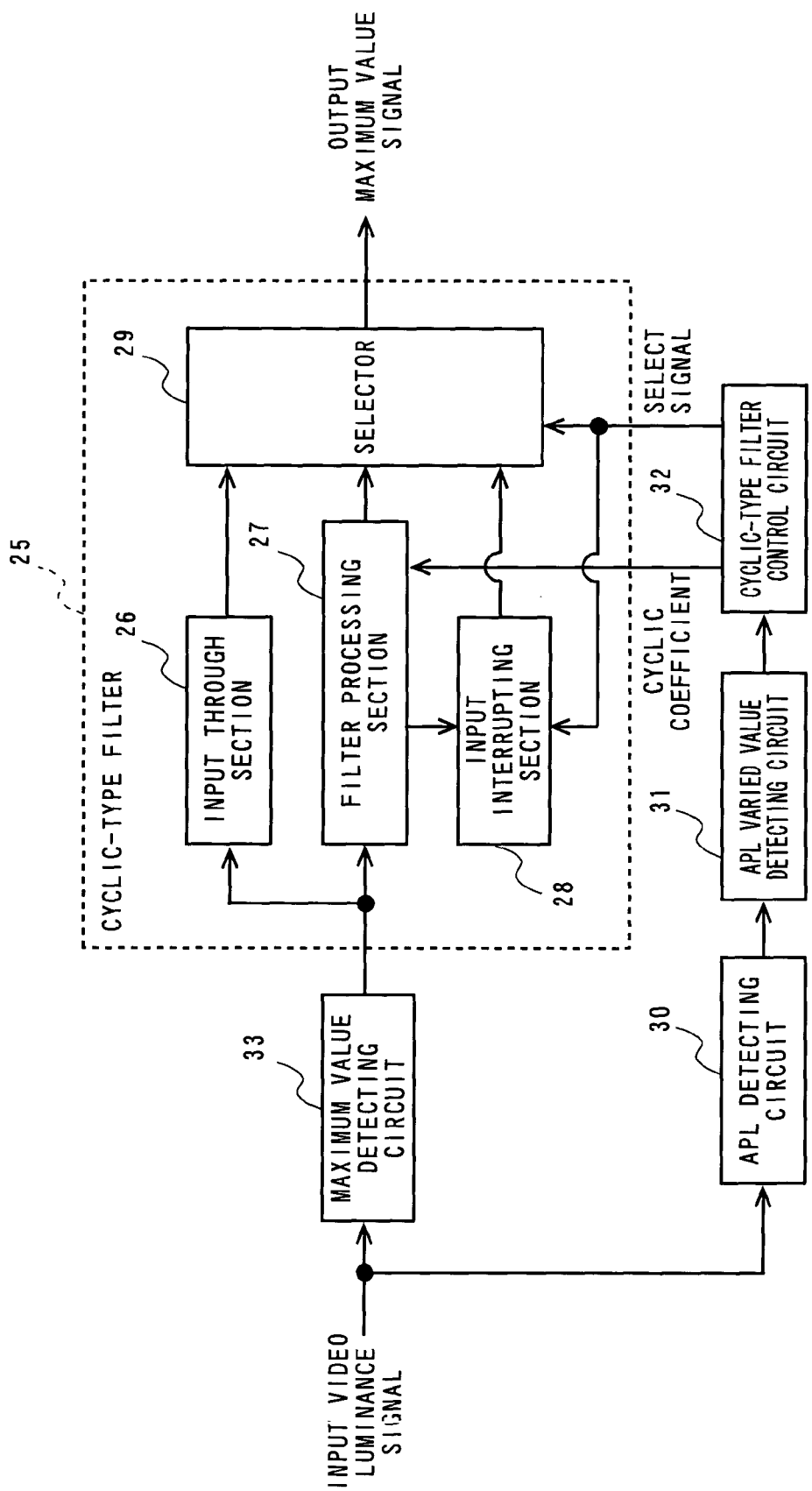
FIG. 18 is a block diagram illustrating an image processing apparatus according to a seventh embodiment of the present invention.

FIG. 18 is a block diagram illustrating the construction of an image processing apparatus according to a seventh embodiment of the present invention. In the present embodiment, consider a case where characteristics such as a maximum value are detected in the input video luminance signal and, based on the detected maximum value (for example, by using the white extension correcting circuit 13 illustrated in FIG. 8), gray-scale correction is performed for motion pictures. In FIG. 18, the image processing apparatus includes a maximum value detecting circuit 33, a cyclic-type filter 25, an APL (average luminance level) detecting circuit 30, an APL varied value detecting circuit 31, and a cyclic-type filter control circuit 32. The cyclic-type filter 25 includes an input through section 26, a filter processing section 27, an input interrupting section 28, and a selector 291. The operation in the seventh embodiment is described below.

An input video luminance signal is supplied to the maximum value detecting circuit 33 and the APL detecting circuit 30. The maximum value detecting circuit 33 detects a maximum value of the video luminance signal within a display area for each field or each frame, and then outputs the detection result to the cyclic-type filter 25. The APL detecting circuit 30 detects an APL (average luminance level) of the video luminance signal within a display area for each field or each frame, and then outputs the detection result to the APL varied value detecting circuit 31. The APL varied value detecting circuit 31 detects for a variation in APL detected by the APL detecting circuit 30 for each field or each frame. Information about this variation in APL is output to the cyclic-type filter control circuit 32. The cyclic-type filter control circuit 32 performs two types of control, control of a cyclic coefficient of the filter processing section 27 in the cyclic type filter 25 and control of the selector 29.

The control of the selector 29 is now described with reference to FIG. 19. An APL varied value illustrated in FIG. 19 is represented as a ratio of the input video luminance signal with respect to the dynamic range. For example, in digital 10-bit processing, when the APL varied value is 50, it is represented as approximately 5% (50/1023). With the use of U and V (which are arbitrary integers where U>V), when the APL varied value detected by the APL varied value detecting circuit 31 is equal to or larger than U %, the cyclic-type filter control circuit 32 controls the selector 29 so that the input through section 26 is selected. When the APL varied value is equal to or smaller than U % and equal to or larger than V %, the selector 29 is controlled so as to select the filter processing section 27. When the APL varied value is equal to or smaller than V %, the selector 29 is controlled so as to select the input interrupting section 28.

Figure 20:
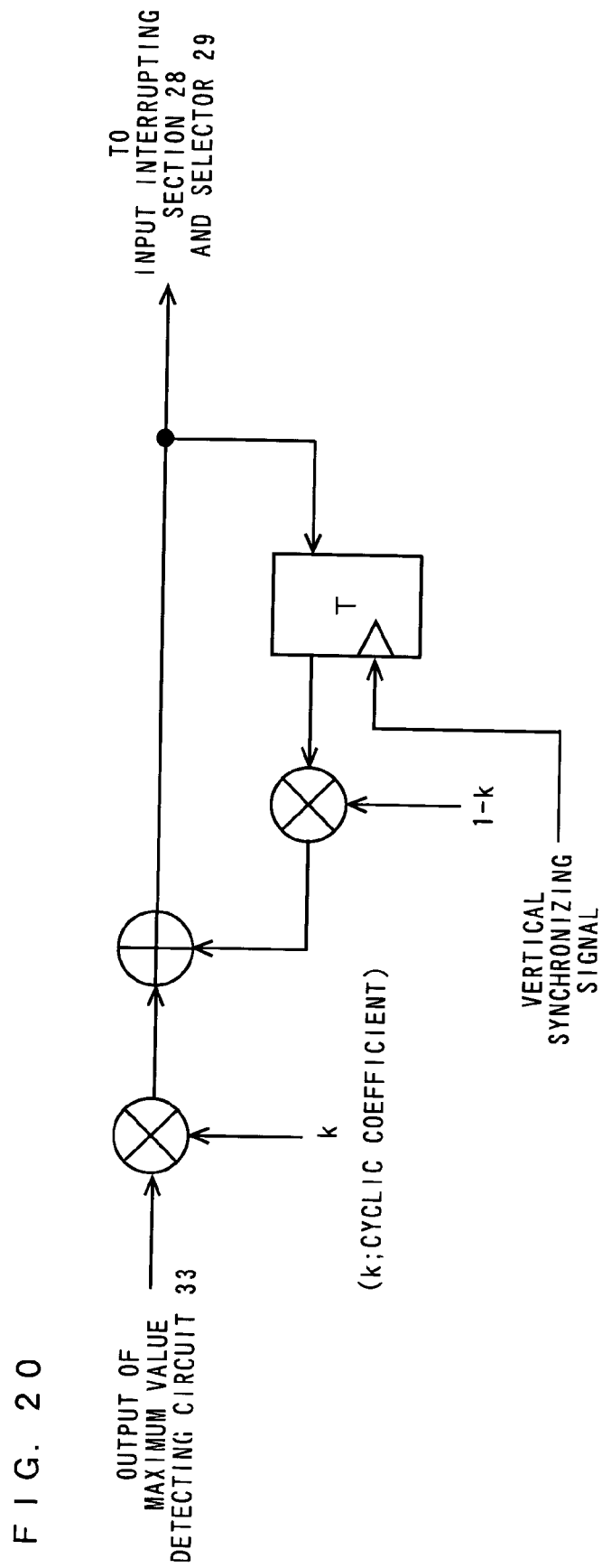
FIG. 20 is an illustration showing one example of a structure of a filter processing section 27.

The cyclic-type filter control circuit 32 performs, in addition to the above control of a select signal, control of the cyclic coefficient of the filter processing section 27. FIG. 20 illustrates the structure of the filter processing section 27. The filter processing section 27 performs cyclic-type filtering on an output of the maximum value detecting circuit 33. Data is updated for each field by a vertical synchronizing signal. The filter processing section 27 uses a cyclic coefficient k to multiply an input from the maximum value detecting circuit 33 by k, multiples a value that is fed back by (1−k), and then adds both values together. The cyclic-type filter control circuit 32 controls the cyclic coefficient k so that it becomes large when the amount of APL variation is large and small when the amount of APL variation is small. An output of the filter processing section 27 is supplied to the input interrupting section 28 and the selector 29.

According to the present embodiment, in a case where a motion picture source is supplied, when the amount of APL variation is equal to or larger than U %, it can be thought that one scene has been changed to another non-successive scene. Therefore, information about any previous maximum value is completely disregarded, and only a current input from the maximum value detecting circuit 33 is selected for output as an output maximum value signal. As such, by completely disregarding the information about any previous maximum value, gray-scale correction that quickly follows the maximum value of the current image can be performed. On the other hand, when the amount of APL variation is smaller than U % and equal to or larger than V %, it can be thought that the scene has been changed not drastically, but successively (such as panning by a camera) in consideration of previous information. Therefore, an input from the filter processing section 27 is selected. As described above, the filter processing section 27 performs the control so that the cyclic coefficient becomes large when the amount of APL variation is large (a ratio of an input from the maximum value detecting circuit 33 is made large) and the cyclic coefficient becomes small when the amount of APL variation is small (a ratio of the input from the maximum value detecting circuit 33 is made small). Thus, in successive scene changes, a degree of how gray-scale correction follows becomes increased when the changes are relatively large, while the degree of how gray-scale correction follows becomes decreased when the changes are relatively small. Note that a converting function for the amount of APL variation and the cyclic coefficient should be set in accordance with a display device. On the other hand, the input interrupting section 28 stores outputs of the filter processing section 27 while updating them as appropriate. When the amount of APL variation becomes smaller than V %, the input interrupting section 28 stops updating of storage based on a control signal from the cyclic-type filter control circuit 32, and outputs the stored values to the selector. With this, when the amount of APL variation becomes small, that is, when parts of objects become varied within the same scene, for example, changes of the maximum value to be detected are completely disregarded, thereby preventing flickering on a display screen due to gray-scale correction.

As described above, according to the seventh embodiment, characteristic detection information of the displayed image, such as the maximum value, is output, is controlled by the cyclic-type filter, or is not updated. With this, it is possible to satisfy the requirement of quickly following the displayed image and also eliminating a subtle fluctuation, thereby achieving gray-scale correction without causing any problem even when motion pictures are displayed.

Note that the threshold values U and V should be optimally set in accordance with the display device. Also, although the maximum value is taken as an example of the characteristic detection information, it is needless to say that a similar structure also goes for the minimum value.

As described in the foregoing, the image processing apparatus and the image processing method according to the present invention correct a gray scale of a signal displayed on a display or the like by optimally adjusting the gray scale in accordance with a video scene, thereby achieving an image display of high image quality.

The invention claimed is:

1. An image processing apparatus which corrects a gray scale by extending part of a luminance level range of an input video luminance signal to a dynamic range of a processing system to output an output video luminance signal, comprising:
    minimum value detecting means for detecting a minimum value of the input video luminance signal;
    luminance distribution detecting means for detecting luminance distribution information of the input video luminance signal from a histogram;
    minimum value correcting means for obtaining a corrected minimum value by correcting the minimum value detected by said minimum value detecting means based on the luminance distribution information detected by said luminance distribution detecting means; and
    luminance signal correcting means for correcting the input video luminance signal by extending the signal so that, when a level of the input video luminance signal is at the corrected minimum value, a level of the output video luminance signal becomes a minimum value of the dynamic range of the processing system, and outputs the corrected signal as the output video luminance signal.

2. The image processing apparatus according to claim 1, wherein
    the luminance distribution information is an amount of distribution in a predetermined luminance range of a histogram distribution of the input video luminance signal.

3. The image processing apparatus according to claim 2, wherein
    the predetermined luminance range is a luminance range in the histogram distribution corresponding to a minimum luminance part.

4. The image processing apparatus according to claim 1, wherein
    the luminance signal correcting means is further for correcting the input video luminance signal in a luminance range so as to be smaller than a predetermined bend point.

5. The image processing apparatus according to claim 4, further comprising
    bend point correcting means for correcting the predetermined bend point in accordance with the luminance distribution information detected by said luminance distribution detecting means.

6. The image processing apparatus according to claim 1, wherein
    the minimum value detected by said minimum value detecting means is a minimum value of a signal obtained after the input video luminance signal is subjected to sampling or has been passed through a low-pass filter, and
    the minimum value correcting means is further for obtaining the corrected minimum value by correcting the minimum value detected by said minimum value detecting means in a decreasing direction based on the luminance distribution information detected by said luminance distribution detecting means.

7. An image processing apparatus which corrects a gray scale by extending part of a luminance level range of an input video luminance signal to a dynamic range of a processing system to output an output video luminance signal, comprising:
    maximum value detecting means for detecting a maximum value of the input video luminance signal;
    luminance distribution detecting means for detecting luminance distribution information of the input video luminance signal from a histogram;
    maximum value correcting means for obtaining a corrected maximum value by correcting the maximum value detected by said maximum value detecting means based on the luminance distribution information detected by said luminance distribution detecting means; and
    luminance signal correcting means for correcting the input video luminance signal by extending the signal so that, when a level of the input video luminance signal is at the corrected maximum value, a level of the output video luminance signal becomes a maximum value of the dynamic range of the processing system, and outputs the corrected signal as the output video luminance signal.

8. The image processing apparatus according to claim 7, wherein
    the luminance distribution information is an amount of distribution in a predetermined luminance range of a histogram distribution of the input video luminance signal.

9. The image processing apparatus according to claim 8, wherein
    the predetermined luminance range is a luminance range in the histogram distribution corresponding to a maximum luminance part.

10. The image processing apparatus according to claim 7, wherein
the luminance signal correcting means is further for correcting the input video luminance signal in a luminance range so as to be larger than a predetermined bend point.

11. The image processing apparatus according to claim 10, further comprising
bend point correcting means for correcting the predetermined bend point in accordance with the luminance distribution information detected by said luminance distribution detecting means.

12. The image processing apparatus according to claim 7, wherein
the maximum value detected by said maximum value detecting means is a maximum value of a signal obtained after the input video luminance signal is subjected to sampling or has been passed through a low-pass filter, and
the maximum value correcting means is further for obtaining the corrected maximum value by correcting the maximum value detected by said maximum value detecting means in an increasing direction based on the luminance distribution information detected by said luminance distribution detecting means.

13. An image processing apparatus which corrects a gray scale by extending part of a luminance level range of an input video luminance signal to a dynamic range of a processing system to output an output video luminance signal, comprising:
minimum value detecting means for detecting a minimum value of the input video luminance signal;
maximum value detecting means for detecting a maximum value of the input video luminance signal;
luminance distribution detecting means for detecting luminance distribution information of the input video luminance signal from a histogram;
minimum value correcting means for obtaining a corrected minimum value by correcting the minimum value detected by said minimum value detecting means based on the luminance distribution information detected by said luminance distribution detecting means;
maximum value correcting means for obtaining a corrected maximum value by correcting the maximum value detected by said maximum value detecting means based on the luminance distribution information detected by said luminance distribution detecting means; and
luminance signal correcting means for correcting the input video luminance signal by extending the signal so that, when a level of the input video luminance signal is at the corrected minimum value, a level of the output video luminance signal becomes a minimum value of the dynamic range of the processing system and, when a level of the input video luminance signal is at the corrected maximum value, a level of the output video luminance signal becomes a maximum value of the dynamic range of the processing system, outputting the corrected signal as the output video luminance signal.

14. An image processing method of correcting a gray scale by extending part of a luminance level range of an input video luminance signal to a dynamic range of a processing system to output an output video luminance signal, comprising:
detecting a minimum value of the input video luminance signal;
detecting luminance distribution information of the input video luminance signal;
obtaining a corrected minimum value by correcting the minimum value detected in said detecting of a minimum value based on the luminance distribution information detected in said detecting of luminance distribution information; and
correcting the input video luminance signal by extending the signal so that, when a level of the input video luminance signal is at the corrected minimum value, a level of the output video luminance signal becomes a minimum value of the dynamic range of the processing system, and outputting the corrected signal as the output video luminance signal.

15. An image processing method of correcting gray scale by extending part of a luminance level range of an input video luminance signal to a dynamic range of a processing system to output an output video luminance signal, comprising:
detecting a maximum value of the input video luminance signal;
detecting luminance distribution information of the input video luminance signal;
obtaining a corrected maximum value by correcting the maximum value detected in said detecting of a maximum value based on the luminance distribution information detected in said detecting of luminance distribution information; and
correcting the input video luminance signal by extending the signal so that, when a level of the input video luminance signal is at the corrected maximum value, a level of the output video luminance signal becomes a maximum value of the dynamic range of the processing system, and outputting the corrected signal as the output video luminance signal.

16. An image processing method of correcting a gray scale by extending part of a luminance level range of an input video luminance signal to a dynamic range of a processing system to output an output video luminance signal, comprising:
detecting a minimum value of the input video luminance signal;
detecting a maximum value of the input video luminance signal;
detecting luminance distribution information of the input video luminance signal;
obtaining a corrected minimum value by correcting the minimum value detected in said detecting of a minimum value based on the luminance distribution information detected in said detecting of luminance distribution information;
obtaining a corrected maximum value by correcting the maximum value detected in said detecting of a maximum value based on the luminance distribution information detected in said detecting of luminance distribution information; and
correcting the input video luminance signal by extending the signal so that, when a level of the input video luminance signal is at the corrected minimum value a level of the output video luminance signal becomes a minimum value of the dynamic range of the processing system and, when a level of the input video luminance signal is at the corrected maximum value a level of the output video luminance signal becomes a maximum value of the dynamic range of the processing system, outputting the corrected signal as the output video luminance signal.

* * * * *